United States Patent
Sasaki et al.

(10) Patent No.: US 9,803,904 B2
(45) Date of Patent: Oct. 31, 2017

(54) REFRIGERANT CYCLE DEVICE

(75) Inventors: Minoru Sasaki, Obu (JP); Takashi Yamanaka, Kariya (JP); Takeshi Wakisaka, Ichinomiya (JP); Motohiro Yamaguchi, Toyokawa (JP); Yasuaki Sasaki, Kariya (JP); Ken Matsunaga, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 851 days.

(21) Appl. No.: 13/472,951

(22) Filed: May 16, 2012

(65) Prior Publication Data

US 2012/0291467 A1    Nov. 22, 2012

(30) Foreign Application Priority Data

May 20, 2011 (JP) ................. 2011-113344

(51) Int. Cl.
*F25B 49/02*    (2006.01)
*B60H 1/32*    (2006.01)
*F25B 27/00*    (2006.01)

(52) U.S. Cl.
CPC ......... *F25B 49/022* (2013.01); *B60H 1/3208* (2013.01); *B60H 2001/3266* (2013.01);
(Continued)

(58) Field of Classification Search
CPC .. F25B 31/02; F25B 1/00; F25B 9/002; F25B 2700/00; F25B 2600/11; F25B 31/002;
(Continued)

(56) References Cited

U.S. PATENT DOCUMENTS 5,617,730 A * 4/1997 Suzuki ............... B60H 1/3208
   62/133
5,975,191 A * 11/1999 Ohashi et al. ............ 165/43
(Continued)

FOREIGN PATENT DOCUMENTS

JP    56-123979    2/1955
JP    63-294466    12/1988
(Continued)

OTHER PUBLICATIONS

Office action dated Jun. 11, 2013 in corresponding Japanese Application No. 2011-113344.

*Primary Examiner* — Frantz Jules
*Assistant Examiner* — Nelson Nieves
(74) *Attorney, Agent, or Firm* — Harness, Dickey & Pierce, P.L.C.

(57) ABSTRACT

A refrigerant cycle device for a vehicle includes a compressor which compresses and discharges refrigerant, a discharge capacity control portion which controls a discharge capacity of the compressor. The refrigerant cycle device further includes a noise determination portion which determines whether an audible noise other than a refrigerant passing noise is in a low noise state, and/or a load determination portion which determines whether an air-conditioning thermal load is in a high load state. The discharge capacity control portion performs a gradual activation control in which the discharge capacity of the compressor is set to be lower than that determined in a normal control, when the noise determination portion determines that the audible noise is in the low noise state, and/or when the load determination portion determines that the air-conditioning thermal load is in the high load state, at an activation time of the compressor.

28 Claims, 9 Drawing Sheets

(52) U.S. Cl.
CPC ...... *B60H 2001/3275* (2013.01); *F25B 27/00* (2013.01); *F25B 2327/001* (2013.01); *F25B 2500/12* (2013.01); *F25B 2600/023* (2013.01); *F25B 2700/195* (2013.01)

(58) Field of Classification Search
CPC .............. F25B 2500/12; F25B 2500/16; F25B 2700/03; F25B 2600/02; F25B 49/022; F25B 2700/171; F25B 2600/025; F25B 49/025; F25B 2600/026; F25B 2700/05; F25B 2327/00; F25B 2327/001; F25B 2600/0271; F25D 21/00; F25D 29/00; F25D 2700/00; F25D 17/045; F24F 13/08; F24F 13/24; F24F 2013/02
USPC .............. 62/80, 83, 115, 126, 129, 186, 193, 62/228.1, 228.4, 228.5, 239, 244, 296, 62/323.1, 323.4, 498
See application file for complete search history.

(56) References Cited

U.S. PATENT DOCUMENTS

| | | | | |
|---|---|---|---|---|
| 6,367,272 | B1 * | 4/2002 | Zeng ................ | B60H 1/00907 62/133 |
| 6,823,687 | B2 * | 11/2004 | Fukumi .............. | B60H 1/3205 417/222.2 |
| 6,931,873 | B2 * | 8/2005 | Oomura et al. ............ | 62/228.4 |
| 2003/0209022 | A1 * | 11/2003 | Ieda et al. ..................... | 62/244 |
| 2004/0206102 | A1 * | 10/2004 | Homan ................ | B60H 1/322 62/228.1 |
| 2005/0274132 | A1 * | 12/2005 | Ohta ...................... | F25B 9/008 62/217 |
| 2005/0284164 | A1 * | 12/2005 | Ohta ...................... | F25B 49/02 62/228.3 |
| 2006/0086113 | A1 * | 4/2006 | Errington ........... | B60H 1/00764 62/181 |
| 2006/0266062 | A1 * | 11/2006 | Takahashi .......... | B60H 1/00849 62/228.1 |
| 2007/0151270 | A1 * | 7/2007 | Matsunaga ........ | B60H 1/00885 62/216 |
| 2007/0245754 | A1 * | 10/2007 | Lee .................... | B60H 1/00971 62/228.5 |
| 2008/0093132 | A1 * | 4/2008 | Wijaya ................ | B60H 1/3208 180/53.8 |
| 2008/0292470 | A1 * | 11/2008 | Sawada ................ | B60H 1/3208 417/15 |
| 2009/0126901 | A1 * | 5/2009 | Hegar ................ | B60H 1/00371 165/41 |
| 2009/0173094 | A1 * | 7/2009 | Taguchi .............. | F04B 27/1804 62/228.5 |
| 2009/0193825 | A1 * | 8/2009 | Hara .................. | B60H 1/00642 62/132 |
| 2009/0211278 | A1 * | 8/2009 | Yamanaka ......... | B60H 1/00978 62/133 |
| 2009/0260375 | A1 * | 10/2009 | Miyazaki ............. | B60H 1/3208 62/133 |
| 2011/0146320 | A1 * | 6/2011 | Tomiyama ........... | B60H 1/3208 62/296 |
| 2011/0192187 | A1 | 8/2011 | Matsumoto | |
| 2012/0318014 | A1 * | 12/2012 | Huff ........................ | F25B 1/10 62/228.1 |
| 2013/0139532 | A1 * | 6/2013 | Hashigaya ......... | B60H 1/00764 62/134 |
| 2013/0213084 | A1 * | 8/2013 | Takizawa ............. | F04C 23/001 62/510 |

FOREIGN PATENT DOCUMENTS

| | | |
|---|---|---|
| JP | 07-223428 | 8/1995 |
| JP | 2010-101553 | 5/2010 |
| JP | 2010-255906 | 11/2010 |

* cited by examiner

REFRIGERANT CYCLE DEVICE

CROSS REFERENCE TO RELATED APPLICATION

This application is based on and incorporates herein by reference Japanese Patent Application No. 2011-113344 filed on May 20, 2011.

TECHNICAL FIELD

The present disclosure relates to a refrigerant cycle device for a vehicle, which can adjust a temperature of air blown into an air-conditioning target space of the vehicle.

BACKGROUND

In a general vehicle air conditioner, a vapor-compression type refrigerant cycle device is adopted as a temperature adjusting portion. The temperature adjusting portion adjusts a temperature of air blown into a vehicle compartment that is an air-conditioning target space. Moreover, in order to reduce the environmental impact such as global warming, refrigerant having a low global warming potential is required to be adopted as refrigerant of the refrigerant cycle device.

Patent Documents 1 and 2 (JP 2010-101553A corresponding to US 2011/0192187A1, and JP 2010-255906A) propose a refrigerant cycle device, in which a relatively new refrigerant such as R1234yf is adopted as refrigerant of the refrigerant cycle device. The relatively new refrigerant has a low global warming potential relative to conventional refrigerant, such as R404a, R410a or R134a, that has been used generally.

Even if the relatively new refrigerant is adopted as refrigerant of an existing refrigerant cycle device used generally for the conventional refrigerant, and if the existing refrigerant cycle device is operated in a conventional operation state, it may be difficult to provide a temperature adjusting performance equivalent to that of a case, in which the conventional refrigerant is adopted as the refrigerant of the existing refrigerant cycle device, in the conventional operation state.

As shown in FIG. 11, R1234yf, which is an example of the relatively new refrigerant, is higher by approximately 20% in density than R134a that is an example of the conventional refrigerant. Thus, when R1234yf is adopted as refrigerant of an existing refrigerant cycle device used generally for R134a, a refrigerant circulation rate in the existing refrigerant cycle device is required to be increased by approximately 20% in order to provide a temperature adjusting performance equivalent to that in a case in which R134a is adopted as the refrigerant of the existing refrigerant device.

The increase of the refrigerant circulation rate causes an increase of a level of a refrigerant passing noise which is generated when refrigerant passes through a cycle components of the refrigerant cycle device. When the existing refrigerant cycle device, in which the relatively new refrigerant is adopted, provides the temperature adjusting performance equivalent to that of the existing refrigerant cycle device, in which the conventional refrigerant is adopted, it may be difficult to keep a sound level of the refrigerant passing noise generated in the existing refrigerant cycle device in which the conventional refrigerant is adopted.

For example, when an air-conditioning thermal load determined based on a condition of the air-conditioning target space is high at an activation time of the compressor for the refrigerant cycle device, the compressor discharges a large amount of refrigerant. Hence, the refrigerant passing noise may become harsh to a passenger. Furthermore, such increase of the refrigerant passing noise may occur not only in a case of R1234yf but also in a case of refrigerant having a higher density than the conventional refrigerant.

SUMMARY

According to an aspect of the present disclosure, a refrigerant cycle device for a vehicle is adapted to adjust a temperature of air blown into an air-conditioning target space by utilizing heat of refrigerant circulating in a refrigerant cycle of the refrigerant cycle device. The refrigerant cycle device includes a compressor, a discharge capacity control portion and a noise determination portion. The compressor is configured to compress refrigerant and to discharge the compressed refrigerant, and the discharge capacity control portion is configured to control a discharge capacity of the compressor. The noise determination portion is configured to determine whether a noise audible to a passenger, other than a refrigerant passing noise generated when refrigerant passes through the refrigerant cycle, is in a low noise state in which a level of the audible noise other than the refrigerant passing noise is equal to or lower than a predetermined noise level. The discharge capacity control portion performs a normal control in which the discharge capacity of the compressor is increased in accordance with increase of an air-conditioning thermal load of the air-conditioning target space. The discharge capacity control portion performs a gradual activation control in which the discharge capacity of the compressor is set to be lower than the discharge capacity determined in the normal control, when the noise determination portion determines that the audible noise other than the refrigerant passing noise is in the low noise state at an activation time of the compressor.

According to another aspect of the present disclosure, a refrigerant cycle device for a vehicle is adapted to adjust a temperature of air blown into an air-conditioning target space by utilizing heat of refrigerant circulating in a refrigerant cycle of the refrigerant cycle device. The refrigerant cycle device includes a compressor, a discharge capacity control portion and a load determination portion. The compressor is configured to compress refrigerant and to discharge the compressed refrigerant, and the discharge capacity control portion is configured to control a discharge capacity of the compressor. The load determination portion is configured to determine whether an air-conditioning thermal load of the air-conditioning target space is in a high load state in which the air-conditioning thermal load is equal to or higher than a predetermined air-conditioning thermal load. The discharge capacity control portion performs a normal control, in which the discharge capacity of the compressor is increased in accordance with increase of the air-conditioning thermal load. The discharge capacity control portion performs a gradual activation control, in which the discharge capacity of the compressor is set to be lower than the discharge capacity determined in the normal control, when the load determination portion determines that the air-conditioning thermal load is in the high load state at an activation time of the compressor.

According to the above-described configurations, the refrigerant cycle device is capable of reducing the refrigerant passing noise at the activation time of the compressor.

BRIEF DESCRIPTION OF THE DRAWINGS

The disclosure, together with additional objectives, features and advantages thereof, will be best understood from the following description, the appended claims and the accompanying drawings in which:

DETAILED DESCRIPTION

Figure 1:
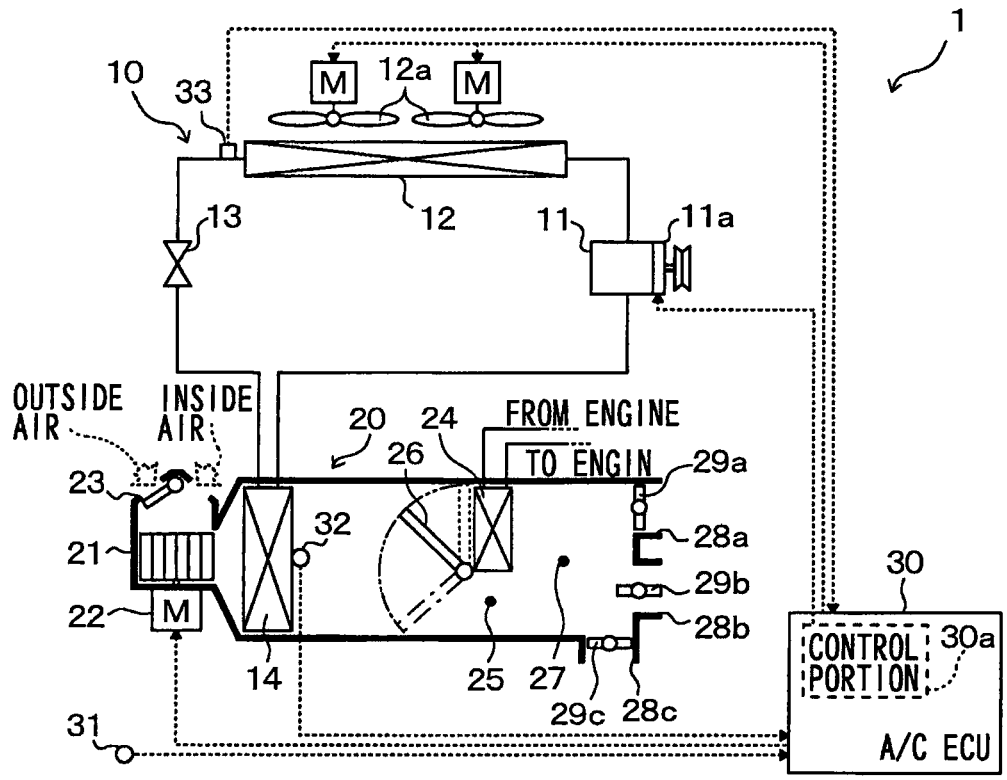
FIG. 1 is a schematic diagram showing a vehicle air conditioner including a refrigerant cycle device according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment of the present disclosure will be described with reference to FIGS. 1 to 4. As shown in FIG. 1, a refrigerant cycle device 10 of the first embodiment is used for an air conditioner 1 of a vehicle, and the refrigerant cycle device 10 is used as an example of a temperature adjusting portion which controls temperature of air blown into a vehicle compartment of the vehicle. Thus, a target space (air-conditioning target space) to be air-conditioned is the vehicle compartment in the present embodiment.

Relatively new refrigerant (e.g., R1234yf) is adopted as refrigerant of the refrigerant cycle device 10, and is lower in a global warming potential than conventional refrigerant (e.g., R134f) that has been used generally. The refrigerant cycle device 10 is a subcritical refrigerant cycle in which a pressure between a discharge side of a compressor 11 of the refrigerant cycle device 10 and an inlet side of an expansion valve 13 of the refrigerant cycle device 10 is kept below a critical pressure of the refrigerant of the refrigerant cycle device 10.

The refrigerant of the refrigerant cycle device 10 contains oil for lubricating the compressor 11, and a part of the oil circulates with the refrigerant in a cycle of the refrigerant cycle device 10. Even when the conventional refrigerant is adopted as the refrigerant of the refrigerant cycle device 10 of the present embodiment, the refrigerant cycle device 10 can be used as an example of the temperature adjusting portion which controls temperature of air blown into the vehicle compartment.

The compressor 11 compresses refrigerant and discharges the compressed refrigerant in the refrigerant cycle device 10. The compressor 11 is disposed in an engine compartment of the vehicle, and is driven by rotary driving force transferred via a pulley and a belt from an internal combustion engine which outputs driving force for vehicle running. The compressor 11 of the present embodiment is a swash plate-type variable displacement compressor in which its discharge amount can be changed by a control signal inputted from outside.

Specifically, the compressor 11 includes a swash plate room into which refrigerant (drawn refrigerant) drawn into the compressor 11 and refrigerant (discharge refrigerant) to be discharged from the compressor 11 are introduced, and a swash plate inclined by a pressure in the swash plate room. An inclination angle of the swash plate is changed depending on the pressure in the swash plate room, and a piston stroke (discharge capacity) of the compressor 11 is changed in accordance with change of the inclination angle of the swash plate. The compressor 11 further includes a discharge-capacity control valve 11a configured to adjust a ratio of introduction amounts into the swash plate room between the drawn refrigerant and the discharge refrigerant.

The discharge-capacity control valve 11a is an electromagnetic valve, and includes therein a pressure sensitive mechanism which generates a force depending on a pressure difference between the drawn refrigerant and the discharge refrigerant in the compressor 11, and an electromagnetic mechanism configured to generate an electromagnetic force opposed to the force due to the pressure difference. An open degree (the ratio of the introduction amounts between the drawn refrigerant and the discharge refrigerant) of the discharge-capacity control valve 11a is set based on a balance between the force due to the pressure difference and the electromagnetic force. Accordingly, the discharge-capacity control valve 11a adjusts the pressure in the swash plate room.

The electromagnetic force from the electromagnetic mechanism is determined by a control current value Ic outputted from an air conditioning controller 30 (A/C ECU) described later. In the present embodiment, when the control current value Ic is increased, the pressure of the swash plate room decreases. By the decrease of the pressure of the swash plate room, the inclination angle of the swash plate is increased, and the piston stroke (discharge capacity) of the compressor 11 is thereby increased. In contrast, when the control current value Ic is decreased, the pressure of the swash plate room increases. By the increase of the pressure of the swash plate room, the inclination angle of the swash plate is decreased, and the piston stroke (discharge capacity) of the compressor 11 is thereby decreased.

The discharge capacity of the compressor 11 is increased or decreased in accordance with increase or decrease of the piston stroke. Hence, the discharge-capacity control valve 11a of the present embodiment is used as an example of a discharge capacity changing portion of the compressor 11. The discharge capacity is defined as a geometric volume of an operational space into which refrigerant is drawn to be compressed, in other words, the discharge capacity is defined as a cylinder volume between a top dead point and a bottom dead point of the piston stroke.

A discharge capacity of a swash plate-type variable displacement compressor can be generally changed continuously within a range almost from 0% to 100%. Therefore, by reducing the discharge capacity to nearly 0%, the compressor 11 can be made to be in a stop state substantially. In the present embodiment, the compressor 11 has a clutch-less configuration so that the compressor 11 is always connected to the engine via the pulley and the belt. In such case, an electromagnetic clutch may be provided, which transfers or interrupts the rotary driving force transmitted toward the compressor 11 from the engine.

The discharge side of the compressor 11 is connected to a radiator 12. The radiator 12 is disposed in the engine compartment, and is used as an example of a heating heat exchanger in which high-temperature and high-pressure refrigerant discharged from the compressor 11 radiates heat by heat exchange with outside air (i.e., air outside of the vehicle compartment) blown by a cooling fan 12a. The cooling fan 12a is an electrical blower fan in which its rotation rate (air blowing amount) is controlled by a control voltage outputted from the air conditioning controller 30.

As described above, because the refrigerant cycle device 10 of the present embodiment is the subcritical refrigerant cycle, the radiator 12 is used as an example of a condenser in which refrigerant is condensed. A liquid receiver (not shown) is arranged on an outlet side of the radiator 12 to separate refrigerant, which has been condensed in the radiator 12, into gas and liquid and to accumulate therein surplus refrigerant.

A refrigerant outlet side of the radiator 12 (i.e., a liquid refrigerant outlet of the liquid receiver) is connected to an inlet side of the expansion valve 13 having a variable throttle mechanism. The expansion valve 13 is used as an example of a decompression portion which decompresses and expands high pressure refrigerant flowing out of the radiator 12 such that the high pressure refrigerant changes into intermediate pressure refrigerant. The expansion valve 13 is used also as an example of a flow rate adjusting portion which adjusts a flow rate of refrigerant flowing downstream of the expansion valve 13 in a refrigerant flow direction. Specifically, the expansion valve 13 of the present embodiment is a thermal type expansion valve which adjusts the flow rate of refrigerant flowing downstream of the expansion valve 13 in the refrigerant flow direction such that a superheat degree of refrigerant flowing out of an outlet side of an evaporator 14 is adjusted within a predetermined range. The evaporator 14 is arranged downstream of the expansion valve 13 in the refrigerant flow direction.

The thermal type expansion valve 13 includes a thermosensing portion arranged in a refrigerant passage of the outlet side of the evaporator 14, and the thermosensing portion detects the superheat degree of refrigerant flowing out of the outlet side of the evaporator 14 based on a temperature and a pressure of the refrigerant flowing out of the outlet side of the evaporator 14. Additionally, the thermal type expansion valve 13 adjusts its valve open degree (refrigerant flow rate) by using an automatic mechanism such that the superheat degree of the refrigerant flowing out of the outlet side of the evaporator 14 becomes a predetermined value.

The outlet side of the thermal type expansion valve 13 is connected a refrigerant inlet side of the evaporator 14. The evaporator 14 is arranged in a casing 21 of an interior air conditioning unit 20 described later, and the evaporator 14 is used as an example of a heat-absorption heat exchanger, in which low pressure refrigerant having been decompressed in the expansion valve 13 exchanges heat with air blown by a blower 22 to evaporate and to exert a heat-absorption effect.

Next, the air conditioning unit 20 will be described. The air conditioning unit 20 is arranged inside an instrument panel at a most front part of the vehicle compartment, and the air conditioning unit 20 includes the casing 21, which constitutes an outer shell of the air conditioning unit 20 and defines therein an air passage for air flowing toward the vehicle compartment. In the air passage, the blower 22, the evaporator 14 and a heating core 24 are accommodated, for example.

An inside/outside air switching device 23 is arranged at a most upstream side of the casing 21 in a flow direction of air flowing therein. The inside/outside air switching device 23 continuously adjusts an open area of an inside air port and an open area of an outside air port by using an inside/outside air switching door. Here, inside air is introduced into the inside air port, and outside air is introduced into the outside air port. Accordingly, the inside/outside air switching device 23 continuously changes a ratio between an inside air amount and an outside air amount introduced into the air passage of the casing 21, thereby switching an air inlet mode.

The air inlet mode switched by the inside/outside air switching device 23 includes an inside air mode in which inside air is introduced into the casing 21 by fully opening the inside air port and by fully closing the outlet air port, an outside air mode in which outside air is introduced into the casing 21 by fully closing the inside air port and by fully opening the outlet air port, and an inside/outside air mode in which inside air and outside air are introduced into the casing 21 by opening both the inside air port and the outside air port.

The blower 22 is arranged downstream of the inside/outside air switching device 23 in the air flow direction to blow air having been drawn via the inside/outside air switching device 23 toward the vehicle compartment. The blower 22 is an electrical blower having a centrifugal multi-blade fan (sirocco fan) driven by an electrical motor, and a rotation rate (air blowing amount) of the blower 22 is controlled by a control voltage (blower voltage) outputted from the air conditioning controller 30.

The blower 22 is arranged upstream of the evaporator 14 in the air flow direction, and additionally, the evaporator 14 is arranged upstream of the heater core 24 in the air flow direction. The heater core 24 is used as an example of a heating heat exchanger which heats air by utilizing engine coolant as a heat source. The casing 21 defines therein a bypass passage 25 through which cool air having passed through the evaporator 14 bypasses the heater core 24.

An air mix door 26 is arranged downstream of the blower 22 and upstream of the heater core 24. The air mix door 26 is used as an example of a heat exchange capacity adjusting portion which adjusts a ratio between a flow rate of air passing through the heater core 24 and a flow rate of air passing through the bypass passage 25, thereby adjusting a heat exchange capacity of the heater core 24.

An operation of the air mix door 26 is driven by an electrical actuator (servomotor) which is controlled by a control signal outputted from the air conditioning controller 30. The casing 21 further defines an air mixing space 27 downstream of the heater core 24 and the bypass passage 25. In the air mixing space 27, air having been heated by heat exchange with refrigerant in the heater core 24 is mixed with non-heated air having passed through the bypass passage 25. As described above, the air mix door 26 adjusts the ratio between the flow rate of air passing through the heater core 24 and the flow rate of air passing through the bypass passage 25. Therefore, by the operation of the air mix door 26, a temperature of air in the air mixing space 27 can be adjusted.

A most downstream part of the casing 21 in the air flow direction has openings through which conditioned air in the air mixing space 27 is blown toward the vehicle compartment that is the air-conditioning target space. The openings are, for example, a defroster opening 28a through which conditioned air is blown toward an inner surface of a windshield of the vehicle, a face opening 28b through which conditioned air is blown toward an upper part of a passenger in the vehicle compartment, and a foot opening 28c through which conditioned air is blown toward a foot area of the passenger.

The defroster opening 28a, the face opening 28b and the foot opening 28c are connected respectively to a defroster air outlet, a face air outlet and a foot air outlet via ducts which define air passages therein.

A defroster door 29a, a face door 29b and a foot door 29c are arranged respectively on upstream sides of the defroster opening 28a, the face opening 28b and the foot opening 28c in the air flow direction. The defroster door 29a, the face door 29b and the foot door 29c adjust open areas of the defroster opening 28a, the face opening 28b and the foot opening 28c, respectively.

The defroster door 29a, the face door 29b and the foot door 29c are used as examples of an air outlet mode changing portion. The air outlet mode changing portion changes an open/close state of each air outlet 29a, 29b, 29c through which air is blown into the vehicle compartment. These three doors 29a to 29c are driven by a not-shown electrical actuator in which an operation of the electrical actuator is controlled by a control signal outputted from the air conditioning controller 30.

The air outlet mode includes a face mode in which conditioned air is blown toward an upper part of a passenger in the vehicle compartment from the face air outlet by fully opening the face air outlet, a bi-level mode in which conditioned air is blown toward the upper part and a foot area of the passenger in the vehicle compartment by opening both the face air outlet and the foot air outlet, and a foot mode in which conditioned air is blown mainly from the foot air outlet by fully opening the foot air outlet and slightly opening the defroster air outlet.

When the passenger controls switches of a control panel (not shown) manually, the air outlet mode can be switched to a defroster mode in which conditioned air is blown toward the inner surface of the windshield of the vehicle from the defroster air outlet by fully opening the defroster air outlet.

Next, an electrical control portion of the present embodiment will be described. The air conditioning controller 30 includes a known microcomputer and its peripheral circuit, and the microcomputer includes a central processing unit (CPU), a read-only memory (ROM) and a random access memory (RAM). The air conditioning controller 30 performs various calculations and processes based on an air conditioning control program stored in the ROM, and controls operations of various air conditioning components (e.g., the discharge-capacity control valve 11a of the compressor 11, the cooling fan 12a, the blower 22 and electrical actuators) connected to an output side of the air conditioning controller 30.

An input side of the air conditioning controller 30 is connected to an air-conditioning sensor group. The air-conditioning sensor group includes an inside temperature sensor which detects a temperature inside the vehicle compartment, an outside temperature sensor 31 which detects a temperature of outside air, a solar radiation sensor which detects a solar radiation amount entering into the vehicle compartment, an evaporator temperature sensor 32 which detects a temperature Te (evaporator temperature) of air flowing out of the evaporator 14, a pressure sensor 33 which detects a pressure Pd (higher-pressure side refrigerant pressure) of refrigerant flowing between the discharge side of the compressor 11 and the inlet side of the expansion valve 13, and a coolant temperature sensor which detects a temperature of coolant flowing into the heater core 24.

The evaporator temperature sensor 32 of the present embodiment detects a temperature of a heat exchange fin of the evaporator 14, for example. Thus, the evaporator temperature sensor 32 can be said to detect a temperature (evaporator temperature) of the evaporator 14. As shown in FIG. 1, the pressure sensor 33 of the present embodiment is arranged to detect a pressure of refrigerant flowing out of the radiator 12. However, a position of the pressure sensor is not limited to this if the pressure sensor 33 is capable of detecting a pressure of refrigerant flowing between the discharge side of the compressor 11 and the inlet side of the expansion valve 13.

The inlet side of the air conditioning controller 30 is further connected to the control panel arranged in the vehicle compartment, and operational signals from various switches of the control panel are inputted to the air conditioning controller 30.

The various switches of the control panel includes an activation switch of the vehicle air conditioner 1, a temperature setting switch used for setting a temperature inside the vehicle compartment, a blowing amount switch used for manually setting the air blowing amount of the blower 22, an inside/outside air switch used for manually setting the air inlet mode, and a defroster switch used as an example of a defroster requirement input portion by using which the air outlet mode is set to be the defroster mode.

The air conditioning controller 30 integrally includes control portions which respectively control the operations of the various air conditioning components connected to the output side of the air conditioning controller 30. Each of the control portions includes hardware and software.

For example, a control portion (hardware and software) which controls the discharge-capacity control valve 11a of the compressor 11 is used as a discharge capacity control portion 30a which controls the discharge capacity of the compressor 11. The discharge capacity control portion 30a may be provided separately from the air conditioning controller 30 as an independent control device.

The air conditioning controller 30 is electrically connected to an engine controller (not shown) which controls an operation of the engine, and the air conditioning controller 30 is thereby capable of reading in electrical signals outputted from the engine controller. The electrical signals include an electrical signal of information relevant to a vehicle speed Vs of the vehicle, and an electrical signal of information relevant to a rotation rate Ne of the engine.

Next, an operation of the vehicle air conditioner 1 having the above-described configuration will be described. In the vehicle air conditioner 1 of the present embodiment, when the activation switch of the control panel is turned ON in a running state of the engine of the vehicle, the air conditioning controller 30 performs the air conditioning program stored in a memory circuit (ROM) of the air conditioning controller 30.

In the air conditioning program, when a normal operation is performed, the discharge capacity of the compressor 11 is increased in accordance with increase of an air-conditioning thermal load determined based on a condition of the vehicle compartment that is the air-conditioning target space. When a predetermined condition is satisfied at an activation time of the compressor 11, the air conditioning controller 30 performs a gradual activation control in which the discharge capacity of the compressor 11 is made to be lower than the discharge capacity determined in the normal operation.

A control (normal control) of the normal operation will be described. When the normal operation is performed, the air conditioning controller 30 reads in detection signals from the above-describe air-conditioning sensor group and operational signals from the control panel. Based on the detection signals and the operational signals, the air conditioning controller 30 calculates a target temperature TAO (target outlet temperature) of air blown into the vehicle compartment.

Specifically, the target outlet temperature TAO can be calculated by using a following formula F1.

$$TAO = Kset \times Tset - Kr \times Tr - Kam \times Tam - Ks \times Ts + C \quad \text{(F1)}$$

Tset is a preset temperature inside the vehicle compartment set by using the temperature setting switch of the control panel, Tr is a temperature inside the vehicle compartment detected by the inside temperature sensor, Tam is a temperature of outside air detected by the outside temperature sensor 31, Ts is a solar radiation amount detected by the solar radiation sensor, Kset, Kr, Kam are control gains, and C is a constant for correction.

Subsequently, the air conditioning controller 30 determines control states of various electrical actuators of the compressor 11, the blower 22, the air mix door 26, the inside/outside air switching device 23, the air outlet mode changing portion (29a, 29b, 29c), and the like. And then, the air conditioning controller 30 outputs control signals to the various electrical actuators such that the determined control states are provided. In the normal control, the air conditioning controller 30 repeatedly performs the above-described procedure until the vehicle air conditioner 1 is stopped, that is, reading in detection signals and operational signals→calculation of the target outlet temperature TAO→determination of control states→output of control signals.

With regard to the determination of control states of the various actuators, a control state of the discharge-capacity control valve 11a of the compressor 11 is, for example, determined such that a target evaporator temperature TEO is decreased in accordance with decrease of the target outlet temperature TAO. The target evaporator temperature TEO is a target temperature of the temperature (evaporator temperature) Te of air flowing out of the evaporator 14, and is determined based on the target outlet temperature TAO by using a control map stored in the memory circuit of the air conditioning controller 30.

Moreover, the discharge capacity of the compressor 11 is determined such that the evaporator temperature Te detected by the evaporator temperature sensor 32 becomes the target evaporator temperature TEO. Specifically, the control current value Ic supplied to the discharge-capacity control valve 11a is determined based on a deviation (Te−TEO) between the evaporator temperature Te and the target evaporator temperature TEO by a proportional-integral control of a feedback control, such that the evaporator temperature. Te approaches the target evaporator temperature TEO.

The target outlet temperature TAO is determined to keep a temperature of the vehicle compartment at the preset temperature Tset which is a temperature desired by a passenger. Thus, when air to be blown into the vehicle compartment is cooled in the evaporator 14 of the refrigerant cycle device 10 of the present embodiment, the air-conditioning thermal load dependent on a condition of the vehicle compartment increases in accordance with decrease of the target outlet temperature TAO.

The evaporator temperature Te is a temperature of the evaporator 14. Thus, the evaporator temperature Te is substantially equal to an evaporation temperature of refrigerant in the evaporator 14. The evaporator temperature Te can be decreased by increasing the discharge capacity of the compressor 11. Therefore, decrease of the target evaporator temperature TEO in accordance with the decrease of the target outlet temperature TAO is equivalent to increase of the discharge capacity of the compressor 11 in accordance with the increase of the air-conditioning thermal load.

A control state of the electrical motor of the blower 22 is determined based on the target outlet temperature TAO by using a control map stored in the memory circuit (ROM). When the target outlet temperature TAO is within an extremely low temperature range (maximum cooling range) or within an extremely high temperature range (maximum heating range), a control voltage outputted from the air conditioning controller 30 to the electrical motor of the blower 22 is set to be largest value. Accordingly, the air blowing amount of the blower 22 is controlled to be an approximately largest amount. The air blowing amount is decreased in accordance with shift of the target outlet temperature TAO toward a middle temperature range from the extremely high temperature range or toward the middle temperature range from the extremely low temperature range.

A control state of the electrical actuator of the air mix door 26 is determined such that an open degree of the air mix door 26 becomes a target open degree SW. Specifically, the target open degree SW is determined by using a following formula F2.

$$SW = [(TAO - Te)/(Tw - Te)] \times 100 (\%) \quad \text{(F2)}$$

Here, Te is the evaporator temperature detected by the evaporator temperature sensor, and Tw is an engine coolant temperature detected by the coolant temperature sensor.

When the target open degree SW=0 (%), the air mix door 26 is positioned at a maximum cooling position as shown by a dashed line in FIG. 1. In this case, an inlet side of the bypass passage 25 is fully open, and an air inlet side of the heater core 24 is fully closed. When the target open degree SW=100 (%), the air mix door 26 is positioned at a maximum heating position as shown by an alternate long and short dashed line in FIG. 1. In this case, the inlet side of the bypass passage 25 is fully closed, and the air inlet side of the heater core 24 is fully open.

A control state of the inside/outside air switching device 23 is determined based on the target outlet temperature TAO by using a control map stored in the air conditioning controller 30. In the present embodiment, the air inlet mode is generally set to be the outside air mode, in which outside air is introduced. However, when a maximum cooling of the vehicle compartment is required, or when a maximum heating of the vehicle compartment is required, the air inlet mode is set to be the inside air mode, in which inside air is introduced. In other words, the inside air mode is selected as the air inlet mode when the target outlet temperature TAO is determined to be within the extremely low temperature range or within the extremely high temperature range.

A control state of the electrical actuator of the air outlet mode changing portion (29a, 29b, 29c) is determined such that the air outlet mode is changed gradually in an order: the face mode→the bi-level mode→the foot mode, in accordance with shift of the target outlet temperature TAO from a low temperature range to a high temperature range.

Hence, the face mode is selected mainly when air to be blown into the vehicle compartment is cooled in a summer season, in other words, the face mode is selected mainly when the target outlet temperature TAO is set to be within the low temperature range. The bi-level mode is selected mainly in spring and autumn seasons, in other words, the bi-level mode is selected mainly when the target outlet temperature TAO is set to be within a middle temperature range. The foot mode is selected mainly when air to be blown into the vehicle compartment is heated in a winter season, in other words, the foot mode is selected mainly when the target outlet temperature TAO is set to be within the high temperature range. Additionally, a humidity sensor may be provided in the vehicle compartment, and the air outlet mode may be set to be the defroster mode when the windshield is determined to be in a state, where a possibility to be fogged is high, based on a detection value from the humidity sensor.

By the above described control, in the normal operation, the discharge capacity of the compressor 11 of the refrigerant cycle device 10 is adjusted in accordance with variation of the air-conditioning thermal load of the vehicle compartment. High-temperature and high-pressure refrigerant discharged from the compressor 11 radiates heat in the radiator 12. High pressure refrigerant flowing out of the radiator 12 is decompressed in the expansion valve 13, and low pressure refrigerant having been decompressed in the expansion valve 13 absorbs heat from air in the evaporator 14 to evaporate. Accordingly, air blown toward the vehicle compartment is cooled.

Moreover, the air cooled in the evaporator 14 flows downstream in the casing 21 of the air conditioning unit 20, and the air conditioning controller 30 determines the ratio between a flow amount of air reheated in the heater core 24 and a flow amount of air passing through the bypass passage 25. Accordingly, a temperature of air conditioned in the mixing space 27 is adjusted. Subsequently, conditioned air having a temperature desired by a passenger is blown into the vehicle compartment from the mixing space 27 through openings that are open depending on the air outlet mode.

Next, a control performed immediately after an activation of the compressor 11 will be described with reference to the flowchart of FIG. 2. Control steps in FIG. 2 constitute a variety of function implementation portions of the air conditioning controller 30 of the present embodiment.

In the clutch-less configuration in which a compressor is always connected to an engine, as in the present embodiment, the compressor always rotates during rotation of the engine. Thus, an activation time of the compressor 11 in the present embodiment is defined as when the discharge capacity of the compressor 11 becomes equal to or higher than a smallest capacity above which the compressor 11 is capable of discharging refrigerant.

In other words, the activation time of the compressor 11 can be defined as when the control current value Ic outputted from the air conditioning controller 30 to the discharge-capacity control valve 11a becomes equal to or higher than a smallest current value Ic at which the discharge capacity of the compressor 11 is set to be the smallest capacity. When an electrical clutch is provided to transfer rotary driving force from the engine to the compressor 11 or to interrupt the transfer of the rotary driving force, the activation time of the compressor 11 may be defined as when the rotary driving force starts to be transferred from the engine to the compressor 11 due to energization of the electrical clutch.

Immediately after the activation time of the compressor 11, the air conditioning controller 30 determines, at step S10, whether the air-conditioning thermal load dependent on a condition of the vehicle compartment is in a high load state, in which the air-conditioning thermal load is equal to or higher than a predetermined air-conditioning thermal load. Thus, a control portion of the air conditioning controller 30 configured to perform the control operation of step S10 in the present embodiment is used as an example of a load determination portion whether the air-conditioning thermal load is in the high load state. When the air-conditioning thermal load is determined to be in the high load state at step S10, a control operation of step S20 is performed. When the air-conditioning thermal load is determined not to be in the high load state at step S10, the normal control is performed.

For example, the air-conditioning thermal load is determined to be in the high load state at step S10, (i) when the outside temperature Tam detected by the outside temperature sensor 31 is equal to or higher than a predetermined outside temperature KTam, and (ii) when the evaporator temperature Te detected by the evaporator temperature sensor 32 is equal to or higher than a predetermined evaporator temperature KTe.

At step S20, the air conditioning controller 30 determines whether a noise audible to a passenger, such as an engine noise or a road noise, other than a noise (refrigerant passing noise) generated when refrigerant passes through the refrigerant cycle device 10, is in a low noise state, in which a level of the audible noise is equal to or lower than a predetermined noise level. Thus, a control portion of the air conditioning controller 30 configured to perform the control operation of step S20 is used as an example of a noise determination portion which determines whether the audible noise other than the refrigerant passing noise is in the low noise state. When the audible noise is determined to be in the low noise state, a control operation of step S30 is performed. When the audible noise is determined not to be in the low noise state, the normal control is performed.

For example, the audible noise is determined to be in the low noise state at step S20, when the vehicle speed Vs is equal to or lower than a predetermined vehicle speed KVs, and when the control voltage (blower voltage) supplied from the air conditioning controller 30 to the electrical motor of the blower 22 is equal to or lower than a predetermined blower voltage.

Figure 3:
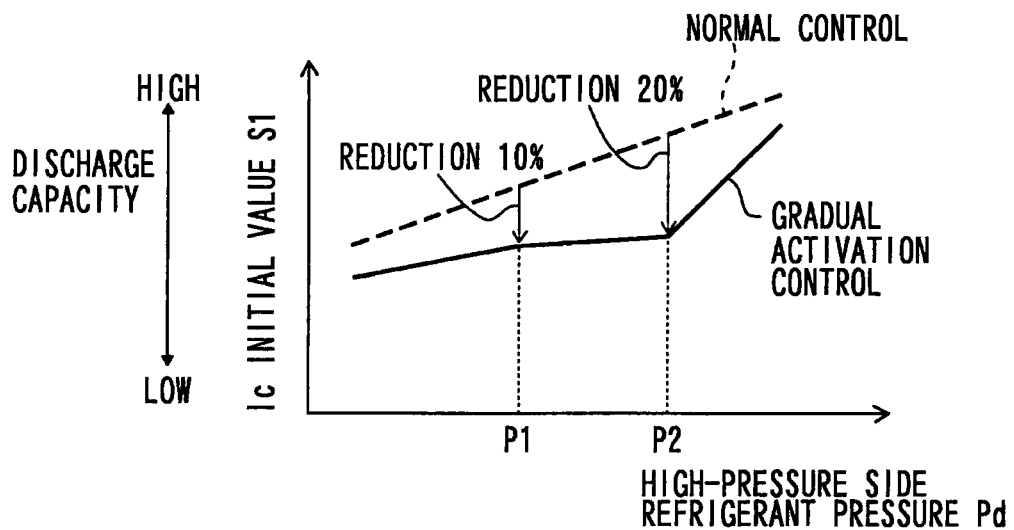
FIG. 3 is a control characteristic showing a relationship between a high-pressure side refrigerant pressure Pd and an Ic initial value S1 (an initial value S1 of a control current value Ic) of a discharge capacity of a compressor for the refrigerant cycle device at an activation time of the compressor, according to the first embodiment.

At step S30, the gradual activation control is performed. In the gradual activation control, the discharge capacity control portion 30a determines an initial value of the discharge capacity of the compressor 11. That is, as shown in FIG. 3, the discharge capacity control portion 30a determines an initial value S1 of the control current value Ic outputted from the air conditioning controller 30 to the discharge-capacity control valve 11a in the gradual activation control. In FIG. 3, the gradual activation control is shown by the solid line, and the normal control is shown by the dashed line for comparison.

As shown in FIG. 3, in the present embodiment, the discharge capacity control portion 30a determines the initial value S1 of the control current value Ic based on the high-pressure side refrigerant pressure Pd detected by the pressure sensor 33 at the activation time of the compressor 11. Specifically, in the normal control, as shown by the dashed line in FIG. 3, the discharge capacity control portion 30a increases the initial value S1 of the control current value Ic in accordance with increase of the high-pressure side refrigerant pressure Pd. In other wards, the discharge capacity control portion 30a increases the initial value of the discharge capacity (i.e., the discharge capacity at the activation time of the compressor 11) in accordance with increase of the high-pressure side refrigerant pressure Pd detected at the activation time of the compressor 11.

Here, the high-pressure side refrigerant pressure Pd before an activation of the compressor 11 generally increases in accordance with increase of the outside temperature Tam, for example. Thus, the increase of the high-pressure side refrigerant pressure Pd before an activation of the compressor 11 means increase of the air-conditioning thermal load of the vehicle compartment. Therefore, increase of the initial value S1 of the control current value Ic in accordance with the increase of the high-pressure side refrigerant pressure Pd is equivalent to increase of the initial value of the discharge capacity of the compressor 11 in accordance with the increase of the air-conditioning thermal load dependent on the condition of the vehicle compartment.

Also in the gradual activation control, as shown by the solid line of FIG. 3, the initial value S1 of the control current value Ic is increased in accordance with increase of the high-pressure side refrigerant pressure Pd, similarly to the normal control. Moreover, in the gradual activation control, the initial value of the discharge capacity of the compressor 11 is determined so as to be lower than the discharge capacity determined in the normal control. Furthermore, in the present embodiment, the discharge capacity control portion 30a determines a difference (reduction amount) between an initial value of the discharge capacity determined in the normal control and an initial value of the discharge capacity determined in the gradual activation control, such that the difference is larger in a range of the higher-pressure side refrigerant pressure Pd between a pressure P1 and a pressure P2 than in other range as shown in FIG. 3. In the range between the pressure P1 and the pressure P2, the refrigerant passing noise is likely to be harsh.

Specifically, as shown in FIG. 3, when the high-pressure side refrigerant pressure Pd is the pressure P1 at the activation time of the compressor 11, the difference between the initial values of the discharge capacities of the normal control and the gradual activation control set to be 10% of an initial value of the discharge capacity determined in the normal control at the pressure P1. When the high-pressure side refrigerant pressure Pd is the pressure P2 at the activation time of the compressor 11, the difference is set to be 20% of an initial value of the discharge capacity determined in the normal control at the pressure P2. Accordingly, the difference between the initial value of the discharge capacity in the normal control and the initial value of the discharge capacity in the gradual activation control is increased in accordance with increase of the air-conditioning thermal load.

Figure 4:
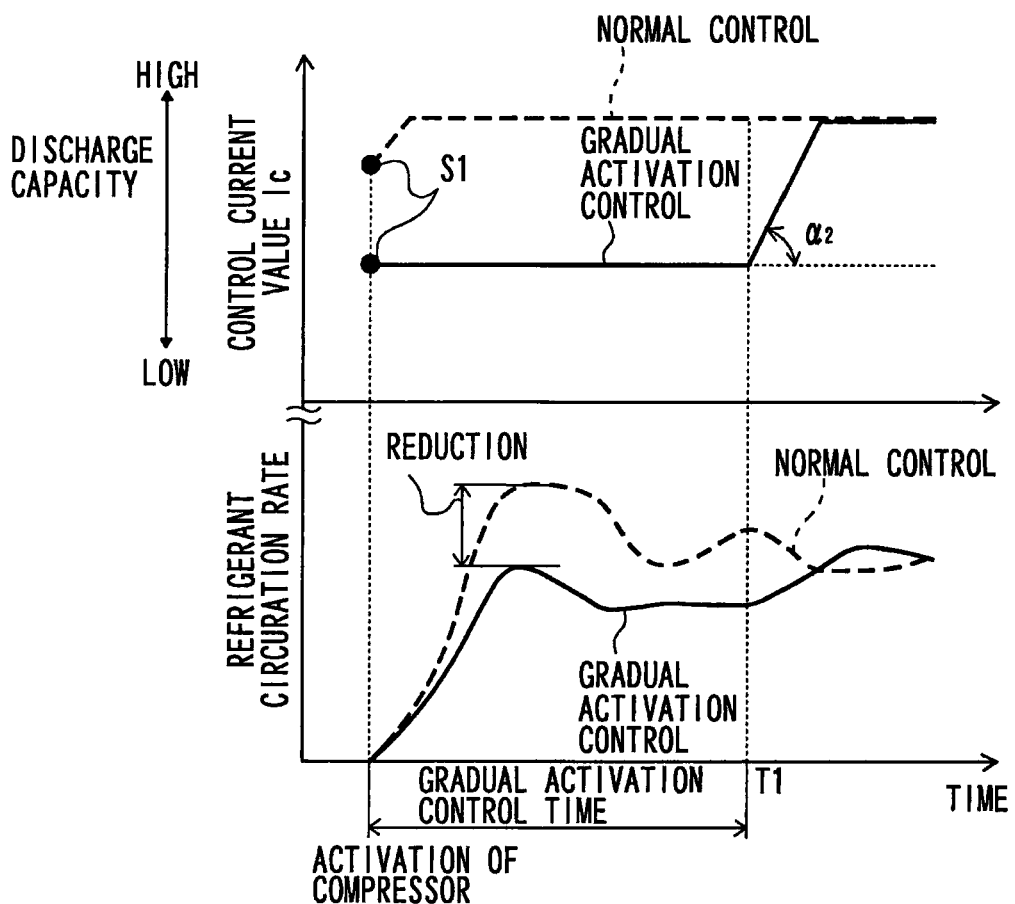
FIG. 4 is a time chart showing the discharge capacity (control current value Ic) of the compressor and a refrigerant circulation rate in the refrigerant cycle device, according to the first embodiment.

The gradual activation control is intermittently continued until the air-conditioning thermal load of the vehicle compartment is determined not to be in the high load state, or until the audible noise other than the refrigerant passing noise is determined not to be in the low noise state. The termination time of the gradual activation control is defined as time T1 shown in FIG. 4. As shown in FIG. 4, the discharge capacities (control current values Ic) of the compressor 11 and the refrigerant circulation rates in the refrigerant cycle device 10 in the normal control and in the gradual activation control vary after the activation time of the compressor 11. In FIG. 4, the variation of the discharge capacity and the refrigerant circulation rate in the normal control are shown by dashed lines, and the variation of the discharge capacity and the refrigerant circulation rate in the gradual activation control are shown by solid lines.

In the normal control, as shown by the dashed lines in FIG. 4, the control current value Ic outputted to the compressor 11 can be increased in accordance with increase of the air-conditioning load of the vehicle compartment. Hence, the refrigerant flow rate can be thereby increased promptly after the activation time of the compressor 11. On the other hand, in the gradual activation control, as shown by the solid lines in FIG. 4, the control current value Ic outputted to the compressor 11 is maintained at the initial value S1 until the gradual activation control is terminated. Therefore, the refrigerant circulation rate can be reduced more in the gradual activation control than in the normal control.

In the present embodiment, after the termination of the gradual activation control, at time T1 shown in FIG. 4, the gradual activation control is switched to the normal control, and the discharge capacity (control current value Ic) of the compressor 11 is gradually increased to be equivalent to the discharge capacity determined in the normal control without steep increase, as shown by an angle $\alpha_2$ in FIG. 4. For example, in the present embodiment, after the termination of the gradual activation control, the normal control is started, and the discharge capacity of the compressor 11 is gradually increased in a rate of torque change of the compressor 11 equal to or lower than 5 Nm/S.

The vehicle air conditioner 1 of the present embodiment is operated as described above. Thus, in the normal control, the discharge capacity of the compressor 11 can be increased promptly in accordance with increase of the air-conditioning thermal load of the vehicle compartment. The refrigerant cycle device 10 can thereby provide an adequate air cooling performance depending on the air-conditioning thermal load.

Moreover, in the vehicle air conditioner 1 of the present embodiment, the discharge capacity of the compressor 11 can be more reduced in the gradual activation control than in the normal control, and the refrigerant circulation rate in the refrigerant cycle device 10 can be thereby decreased more in the gradual activation control than in the normal control.

If the normal control is performed when the air-conditioning thermal load is in the high load state, the refrigerant circulation rate is so high that a level of the refrigerant passing noise may become high. If the normal control is performed when the audible noise other than the refrigerant passing noise is in the low noise state, the refrigerant passing noise may be easy to be heard by a passenger in the vehicle compartment. Therefore, in such cases (in the high load state and in the low noise state), generation of the refrigerant passing noise harsh for the passenger can be limited effectively by performing the gradual activation control to reduce the refrigerant circulation rate.

The gradual activation control is performed when the above-described two conditions are satisfied. In other words, the gradual activation control is performed when the air-conditioning thermal load of the vehicle compartment is in the highly-laded state, and when the audible noise other than refrigerant passing noise is in the low noise state. Therefore, an air-temperature adjusting ability (air cooling capacity) of the refrigerant cycle device 10 can be prevented from being reduced unnecessarily.

In the present embodiment, the difference between the initial value of the discharge capacity determined in the normal control and the initial value of the discharge capacity determined in the gradual activation control is determined based on the air-conditioning thermal load. Hence, the air-temperature adjusting ability of the refrigerant cycle device 10 can be further effectively prevented from being reduced unnecessarily.

In the present embodiment, after a termination of the gradual activation control at time T1, the gradual activation control is switched to the normal control, and the discharge capacity of the compressor 11 is gradually increased. Thus, when the gradual activation control is switched to the normal control at time T1, the discharge capacity of the compressor 11 can be avoided from increasing sharply. When the rotary driving force is transferred from the engine to the compressor 11 via the pulley and the belt as with the present embodiment, such gradually-increase control manner may be remarkably effective at limiting variation of the engine rotation rate Ne due to variation of driving torque of the compressor 11.

As described above, even if the conventional refrigerant (R134a) is adopted as refrigerant used in the refrigerant cycle device 10, the refrigerant cycle device 10 can be used as an example of the temperature adjusting portion which cools air. Thus, an existing refrigerant cycle device for the R134a may be used as the refrigerant cycle device 10 of the present embodiment.

Figure 11:
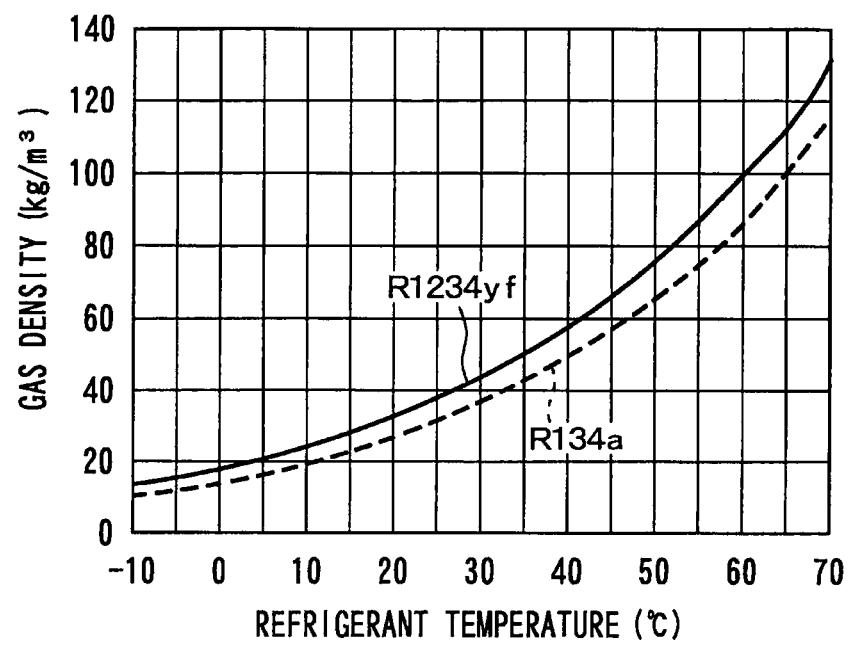
FIG. 11 is a diagram showing density changes of R134a and R1234yf with respect to temperature.

As shown in FIG. 11, the refrigerant R1234f adopted in the present embodiment is higher in density than the R134a. When the R1234f is adopted as refrigerant of the existing refrigerant cycle device for the R134a, a refrigerant circulation rate needs to be increased in order to obtain an air-temperature adjusting ability equivalent to that in a case in which the R134a is adopted as the refrigerant of the existing refrigerant cycle device. In this case, a level of the refrigerant passing noise may become high relative to that in the case in which the R134a is adopted as the refrigerant of the existing refrigerant cycle device.

On the other hand, in the vehicle air conditioner 1 of the present embodiment, even when the R1234f is adopted as refrigerant of the existing refrigerant cycle device that is generally used for the R134a, the refrigerant passing noise can be limited effectively. Thus, the existing refrigerant cycle device for the R134a can be used as the refrigerant cycle device 10 of the present embodiment. In other words, choices of refrigerant adoptable for the existing refrigerant cycle device can be increased, and versatility of the existing refrigerant cycle device can be improved.

(Second Embodiment)

Figure 5:
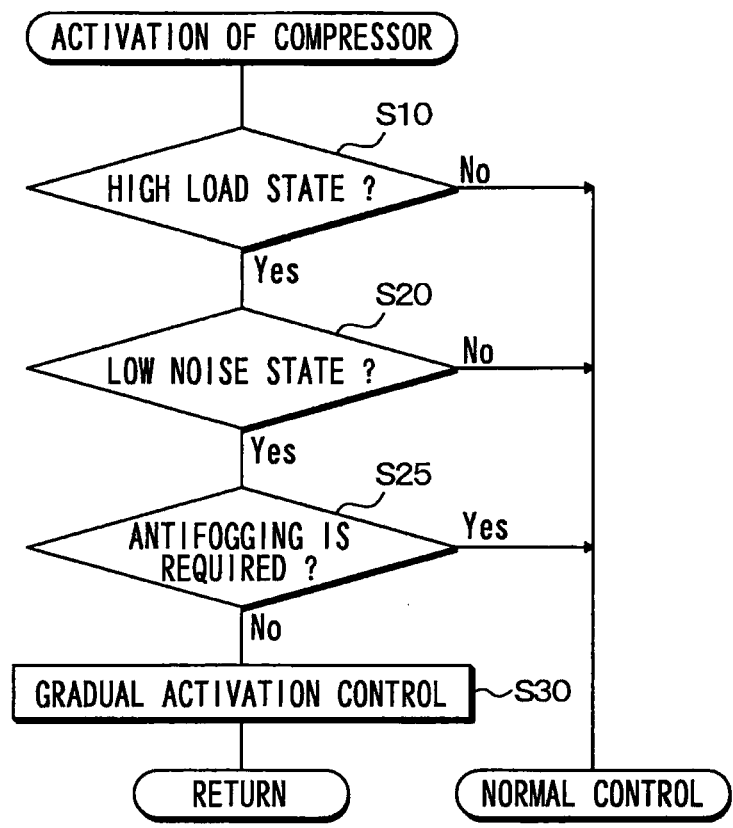
FIG. 5 is a flowchart showing a part of a control flow of a refrigerant cycle device according to a second embodiment of the present disclosure.

In a second embodiment, the air conditioning controller 30 controls the vehicle air conditioner 1 in a different manner from the first embodiment immediately after the activation time of the compressor 11. Specifically, as shown in FIG. 5, when the audible noise other than the refrigerant passing noise is determined to be in the low noise state at step S20, the air conditioning controller 30 performs a control operation of step S25. In FIG. 5, the same or equivalent parts to the first embodiment are assigned the same numerals, and this is similar to the following drawings.

At step S25, the air conditioning controller 30 determines whether the defroster door 29a is positioned to open the defroster opening 28a or not. Specifically, the air conditioning controller 30 determines whether the defroster switch of the control panel is turned ON or not. When the defroster switch is determined not to be turned ON at step S25, the control operation of step S30 is performed. When the defroster switch is determined to be turned ON at step S25, the normal control is performed.

In the second embodiment, other configuration and operation of the vehicle air conditioner 1 are similar to those of the first embodiment. In the vehicle air conditioner 1 of the present embodiment, when the air conditioning controller 30 determines that the defroster switch is turned ON at step S25, the gradual activation control is not performed. Thus, the windshield can be ensured to be prevented from fogging in priority to reduction of the refrigerant passing noise. A control portion of the air conditioning controller 30 that performs the control operation of step S25 is used as an example of an antifogging requirement determination portion which determines whether the defroster door 29a is positioned to open the defroster opening 28a or not.

The turned-ON state of the defroster switch means that antifogging of the windshield is required by a passenger. In order to ensure visibility from the windshield, the temperature adjusting ability of the refrigerant cycle device 10 may be required not to be reduced. In the present embodiment, when the passenger requires the antifogging of the windshield, the normal control, not the gradual activation control, is performed. Accordingly, the visibility from the windshield can be ensured.

At the activation time of the compressor 11, (i) when the air-conditioning thermal load of the vehicle compartment is determined to be in the high load state, (ii) when the audible noise other than the refrigerant passing noise is determined to be in the low noise state, and (iii) when the defroster door 29a is positioned to close or narrow the defroster opening 28a and to interrupt an outflow of air from the defroster air outlet, the gradual activation control can be performed. Even in this case, similar effects to the first embodiment can be obtained.

(Third Embodiment)

Figure 6:
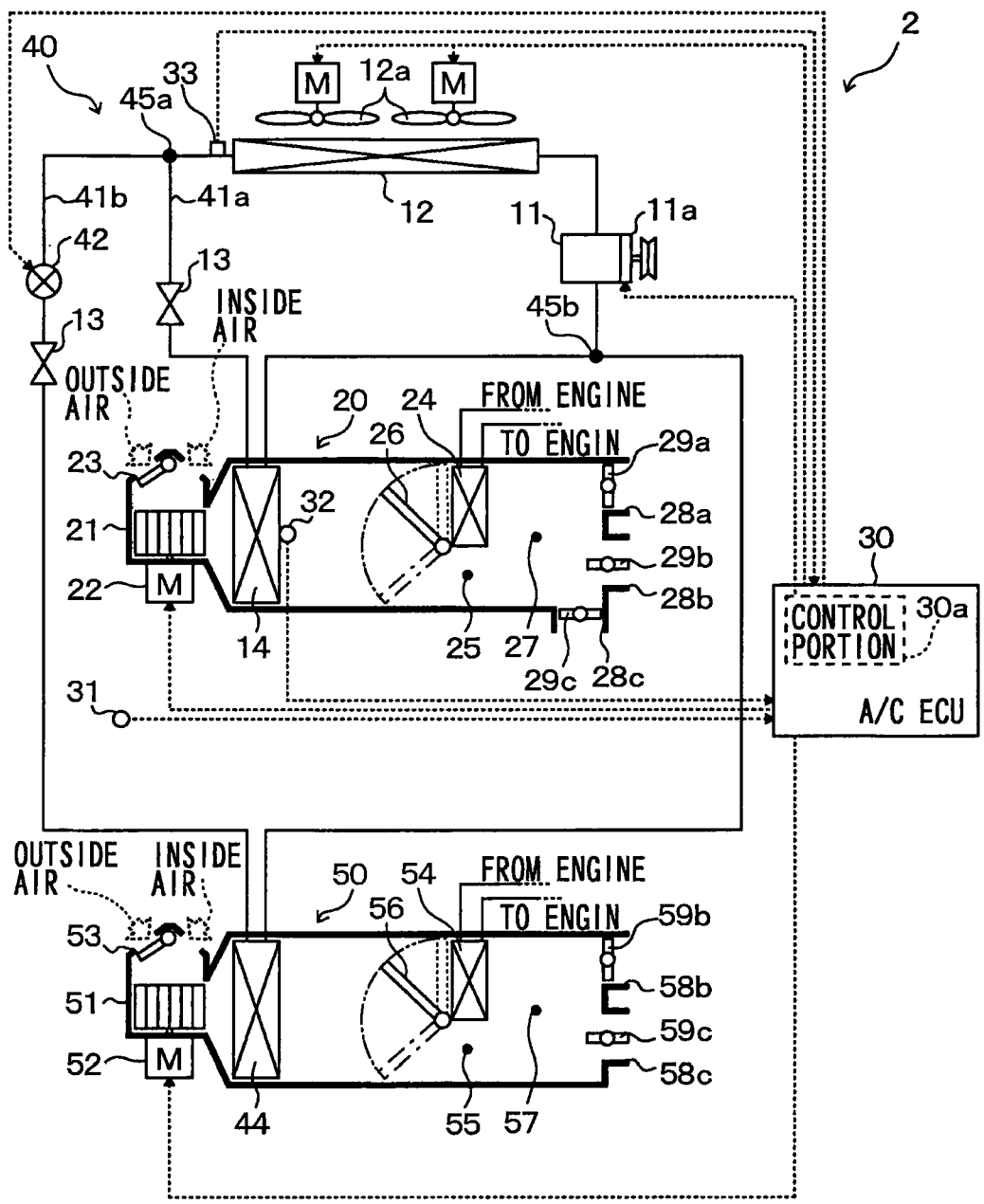
FIG. 6 is a schematic diagram showing a vehicle air conditioner including a refrigerant cycle device according to a third embodiment of the present disclosure.

In the above first embodiment, the refrigerant cycle device 10 having the single evaporator 14, in which refrigerant evaporates, is used for the vehicle air conditioner 1. In a third embodiment, as shown in FIG. 6, a refrigerant cycle device 40 having two evaporators 14, 44 is used for the dual-type vehicle air conditioner 2 including two air conditioning units: the front-seat air conditioning unit 20 and a rear-seat air conditioning unit 50.

In the refrigerant cycle device 40 of the present embodiment, a flow of high pressure refrigerant flowing out of the radiator 12 is branched at a branching part 45a into a front-seat refrigerant pipe 41a and into a rear-seat refrigerant pipe 41b. In the front-seat refrigerant pipe 41a, the expansion valve 13 and the evaporator 14 are disposed similarly to the first embodiment. On the other hand, in the rear-seat refrigerant pipe 41b, an open-close valve 42, a rear-seat expansion valve 43 and a rear-seat evaporator 44 are disposed.

The open-close valve 42 is used as an example of an open-close portion that opens or closes the rear-seat refrigerant pipe 41b. The open-close valve 42 is an electromagnetic valve in which its operation is controlled by a control voltage outputted from the air conditioning controller 30. A basic structure of the rear-seat expansion valve 43 is similar to that of the expansion valve 13 provided in the front-seat refrigerant pipe 41a, and a basic structure of the rear-seat evaporator 44 is similar to that of the evaporator 14 provided in the front-seat refrigerant pipe 41a. In the present embodiment, the expansion valve 13 is described as a front-seat expansion valve 13 for clarification of difference from the rear-seat expansion valve 43, and the evaporator 14 is described as a front-seat evaporator 14 for clarification of difference from the rear-seat evaporator 44.

Low pressure refrigerant flowing out of the front-seat evaporator 14 and low pressure refrigerant flowing out of the rear-seat evaporator 44 are combined with each other at a meeting point 45b connected to a suction side of the compressor 11, and the combined refrigerant is drawn into the compressor 11. When the open-close valve 42 closes the rear-seat refrigerant pipe 41b, refrigerant flows in the refrigerant cycle device 40 similarly to refrigerant flowing in the refrigerant cycle device 10 of the first embodiment. When the open-close valve 42 opens the rear-seat refrigerant pipe 41b, the front-seat evaporator 14 and the rear-seat evaporator 44 are coupled to each other in parallel, and refrigerant flows into both the front-seat evaporator 14 and the rear-seat evaporator 44 in the refrigerant cycle device 40.

The front-seat evaporator 14 is arranged in the casing 21 of the front-seat air conditioning unit 20 that is configured all the same as the first embodiment. In the front-seat air conditioning unit 20, air is blown toward the front seat from the face air outlet and the foot air outlet. Thus, the front-seat evaporator 14 has a function to let air to be blown toward the front seat in the vehicle compartment exchange heat with low pressure refrigerant so that the low pressure refrigerant evaporates.

The rear-seat evaporator 44 is arranged in a casing 51 of the rear-seat air conditioning unit 50 located on a rear side of the rear seat, and a basic configuration of the rear-seat air conditioning unit 50 is similar to that of the front-seat air conditioning unit 20. Hence, in also the rear-seat air conditioning unit 50, for example, a blower 52, the rear-seat evaporator 44, a heater core 54 and an air mix door 56 are accommodated in an air passage provided in the casing 51.

An inside/outside air switching device 53 is arranged at a most upstream side of the casing 51 in an air flow direction, and an air bypass passage 55 and a mixing space 57 are provided in the air passage of the casing 51. A rear-seat face opening 58b, through which conditioned air is blown toward an upper part of a passenger on the rear seat, and a rear-seat foot opening 58c, through which conditioned air blown toward a foot area of the passenger on the rear seat, are provided at a most downstream side of the casing 51 in the air flow direction.

At upstream sides of the rear-seat face opening 58b and the rear-seat foot opening 58c in the air flow direction, a rear-seat face door 59b and a rear-seat foot door 59c are arranged respectively. The rear-seat face door 59b adjusts an open area of the rear-seat face opening 58b, and the rear-seat foot door 59c adjusts an open area of the rear-seat foot opening 58c. In the present embodiment, the rear-seat evaporator 44 has a function to let air to be blown toward the rear seat in the vehicle compartment exchange heat with low pressure refrigerant so that the low pressure refrigerant evaporates.

The front-seat air conditioning unit 20 is located in a front part of the vehicle to be near to the engine compartment, and the rear-seat air conditioning unit 50 is located in a rear part of the vehicle to be farther from the engine compartment than the front-seat air conditioning unit 20, such that a distance from the engine compartment to the rear-seat air conditioning unit 50 is longer than a distance from the engine compartment to the front-seat air conditioning unit 20. Therefore, the front-seat evaporator 14 is located to be nearer to the compressor 11 than the rear-seat evaporator 44, and a length of the front-seat refrigerant pipe 41a is shorter than a length of the rear-seat refrigerant pipe 41b.

In the present embodiment, the length of the front-seat refrigerant pipe 41a and the length of the rear-seat refrigerant pipe 41b are defined respectively as total lengths of refrigerant pipes from the branching point 45a to the meeting point 45b. At the branching point 45a, a flow of high pressure refrigerant flowing downstream of the radiator 12 is branched into the refrigerant pipes 41a, 41b. At the meeting point 45b, flows of low pressure refrigerant from the refrigerant pipes 41a, 41b are combined with each other to flow to the suction side of the compressor 11.

A control panel of the vehicle air conditioner 2 of the present embodiment further includes a rear-seat air conditioning start switch and a rear-seat air blowing amount setting switch. A passenger can start rear-seat air conditioning by using the rear-seat air conditioning start switch, and an air blowing amount of the rear-seat blower 52 can be manually set by using the rear-seat air blowing amount setting switch. Other configuration of the control panel of the vehicle air conditioner 2 is similar to the first embodiment.

Next, an operation of the vehicle air conditioner 2 of the present embodiment will be described. The vehicle air conditioner 2 can be operated in a single mode, in which conditioned air is blown toward the front seat, and a dual mode, in which conditioned air is blown toward both the front seat and the rear seat. The single mode and the dual mode can be switched therebetween by using the rear-seat air conditioning start switch.

Specifically, when the rear-seat air conditioning start switch is turned ON, the air conditioning controller 30 opens the open-close valve 42 so that refrigerant flows into both the front-seat refrigerant pipe 41a and the rear-seat refrigerant pipe 41b. Accordingly, the single mode is switched to the dual mode. In contrast, when the rear-seat air conditioning start switch is turned OFF, the air conditioning controller 30 closes the open-close valve 42 so that refrigerant flows only into the front-seat refrigerant pipe 41a. Thus, the dual mode is switched to the single mode.

A control of the normal operation by the air conditioning controller 30 in the third embodiment is basically similar to that in the first embodiment, in any operation mode of the single mode and the dual mode. Thus, in the normal operation, the discharge capacity control portion 30a increases the discharge capacity of the compressor 11 in accordance with increase of the air-conditioning thermal load of the vehicle compartment, and the air conditioning controller 30 controls operations of electrical actuators such that a temperature of air blown to the front seat and the rear seat becomes a temperature desired by a passenger.

The blower 52 of the rear-seat air conditioning unit 50, an electrical actuator of the air mix door 56, and electrical actuators of the rear-seat doors 59b, 59c are controlled only in the dual mode. Hence, in the single mode in the normal operation, the vehicle air conditioner 2 is operated all the same as the vehicle air conditioner 1 of the first embodiment. In the dual mode in the normal operation, conditioned air is blown from openings of the front-seat air conditioning unit 20 and from openings of the rear-seat air conditioning unit 50 toward the front seat and the rear seat respectively.

Figure 7:
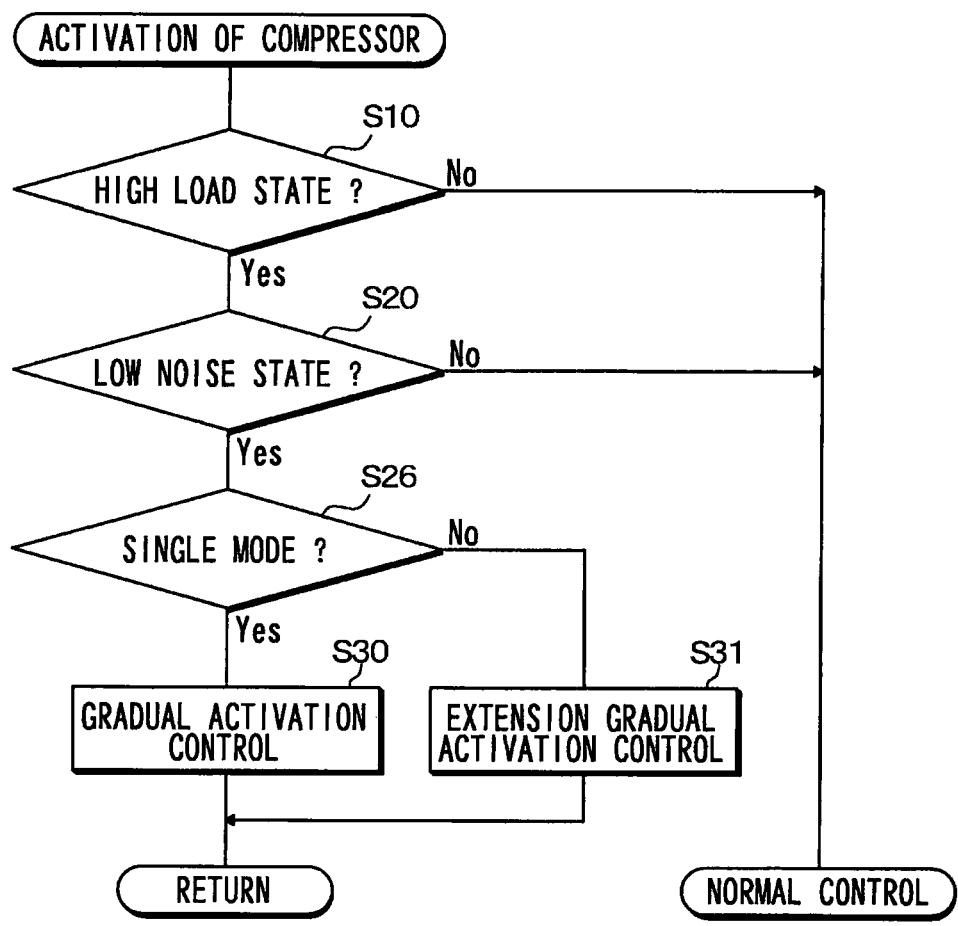
FIG. 7 is a flowchart showing a part of a control flow of the refrigerant cycle device according to the third embodiment.

Next, a control of the present embodiment, performed immediately after an activation of the compressor 11, will be described referring to the flowchart of FIG. 7. As shown in FIG. 7, in the control of the present embodiment immediately after the activation time of the compressor 11, when the audible noise other than the refrigerant passing noise is determined to be in the low noise state at step S20, a control operation of step S26 is performed. At step S26, the air conditioning controller 30 determines whether the operation mode of the vehicle air conditioner 2 is the single mode or not.

Specifically, at step S26, when the air conditioning controller 30 determines that the rear-seat air conditioning start switch is turned OFF, in other words, when the air conditioning controller 30 determines that the single mode is selected as the operation mode of the vehicle air conditioner 2, the control operation of step S30 is performed. On the other hand, at step S26, when the air conditioning controller 30 determines that the rear-seat air conditioning start switch is tuned ON, in other words, when the air conditioning controller 30 determines that the single mode is not selected as the operation mode of the vehicle air conditioner 2, a control operation of step S31 is performed.

At step S30, the gradual activation control similar to the first embodiment is performed. At step S31, an extension gradual activation control is performed. In the extension gradual activation control, a control similar to the gradual activation control performed at step S30 is continuously performed for a predetermined extension time Tex (e.g., 10 seconds) after the air-conditioning thermal load of the vehicle compartment is determined not to be in the high load state, or after the audible noise other than the refrigerant passing noise is determined not to be in the low noise state. In the present embodiment, the termination time of the gradual activation control is defined as T1, and the termination time of the extension gradual activation control is defined as T2 (T1+Tex), as shown in FIG. 4.

Other operation of the vehicle air conditioner 2 is similar to the operation of the vehicle air conditioner 1 of the first embodiment. In the vehicle air conditioner 2 of the present embodiment, in the normal operation, the discharge capacity of the compressor 11 of the refrigerant cycle device 40 can be increased in accordance with increase of the air-conditioning thermal load of the vehicle compartment in both the single mode and the dual mode. Therefore, the refrigerant cycle device 40 can provide an air cooling performance properly depending on the air-conditioning thermal load of the vehicle compartment.

Moreover, by performing the gradual activation control in the single mode, generation of the refrigerant passing noise, which is harsh for a passenger, can be limited similarly to the first embodiment. In the dual mode, the extension gradual activation control is performed, so that a period of performing a runtime of the gradual activation control is extended. Accordingly, generation of the refrigerant passing noise harsh for passengers on both the front seat and the rear seat can be limited effectively in the dual mode.

The limitation of the generation of the refrigerant passing noise by performing the extension gradual activation control will be described referring to FIG. 8. In the upper time chart in FIG. 8, a variation of the discharge capacity (control current value Ic) of the compressor 11 determined in the gradual activation control is shown by a solid line, a variation of the discharge capacity determined in the extension gradual control is shown by an alternate long and short dash line, and a variation of the discharge capacity determined in the normal control is shown by a dash line.

Figure 8:
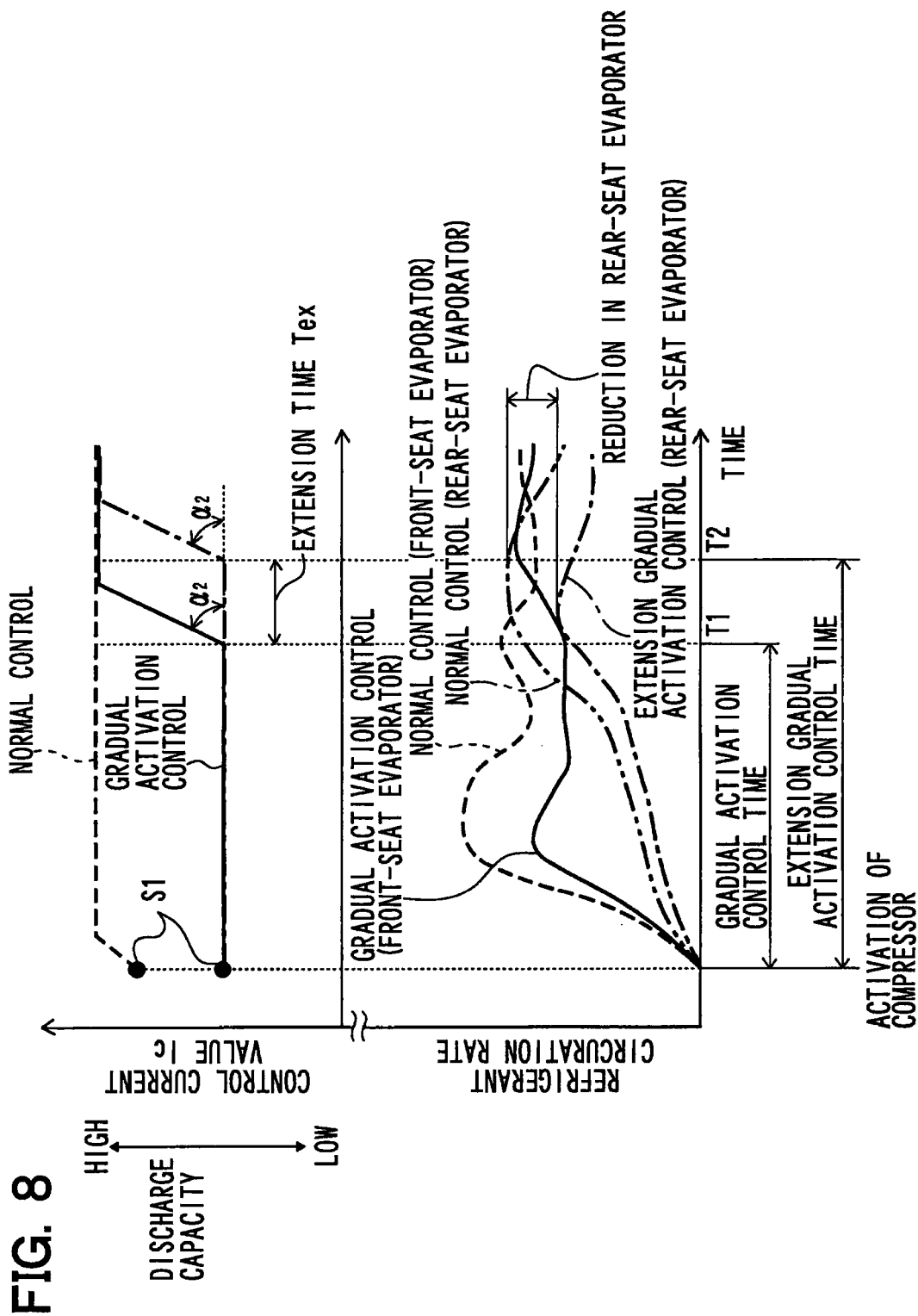
FIG. 8 is a time chart showing a discharge capacity (control current value Ic) of a compressor for the refrigerant cycle device and a refrigerant circulation rate in the refrigerant cycle device, according to the third embodiment.

In the lower time chart in FIG. 8, a variation of the refrigerant circulation rate in the front-seat evaporator 14 in the gradual activation control is shown by a solid line, and a variation of the refrigerant circulation rate in the front-seat evaporator 14 in the normal control is shown by a dash line. Additionally, a variation of the refrigerant circulation rate in the rear-seat evaporator 44 in the extension gradual activation control is shown by an alternate long and short dash line, and a variation of the refrigerant circulation rate in the rear-seat evaporator 44 in the normal control is shown by an alternate long and two short dash line in the normal control.

As with the present embodiment, the front-seat evaporator 14 is located to be nearer to the compressor 11 than the rear-seat evaporator 44, and the front-seat refrigerant pipe 41a is shorter than the rear-seat refrigerant pipe 41b. Thus, as shown in the lower time chart of FIG. 8, an increasing rate of the refrigerant circulation rate in the front-seat evaporator 14 is higher than an increasing rate of the refrigerant circulation rate in the rear-seat evaporator 44 immediately after the activation time of the compressor 11 in the dual mode.

Hence, a level of the refrigerant passing noise generated in the rear-seat evaporator 44 increases after increase of a level of the refrigerant passing noise generated in the front-seat evaporator 14.

In the vehicle air conditioner 2 of the present embodiment, the extension gradual activation control is performed in the dual mode. Thus, a period of reducing the discharge capacity of the compressor 11 is longer in the dual mode than in the single mode. Therefore, not only the refrigerant passing noise generated when refrigerant passes through the front-seat evaporator 14 but also the refrigerant passing noise generated when refrigerant passes through the rear-seat evaporator 44 can be reduced.

Also in the vehicle air conditioner 2 of the present embodiment, as described in the second embodiment, when the air conditioning controller 30 determines that the defroster switch is turned ON, the gradual activation control and the extension gradual activation control may be not performed such that the visibility (safety) from the windshield can be ensured in priority to reduction of the refrigerant passing noises.

Specifically, the operational control of step S25 of the second embodiment may be added next to the control operation of step S20 in FIG. 7. When the defroster switch is determined not to be turned ON, the control operation of step S26 may be performed. When the defroster switch is determined to be turned ON, the normal control may be performed.

Although the present disclosure has been fully described in connection with the preferred embodiments thereof with reference to the accompanying drawings, it is to be noted that various changes and modifications will become apparent to those skilled in the art. That is, the present disclosure is not limited to the above-described embodiments, and can be modified variously as follows without departing from the scope of the present disclosure.

(1) In the above-described embodiment, the initial value of the discharge capacity of the compressor 11 in the gradual activation control, i.e., the initial value S1 of the control current value Ic outputted to the discharge-capacity control valve 11*a* in the gradual activation control is determined as shown in FIG. 3. The determination of the initial value of the discharge capacity of the compressor 11 in the gradual activation control is not limited to this.

Figure 9:
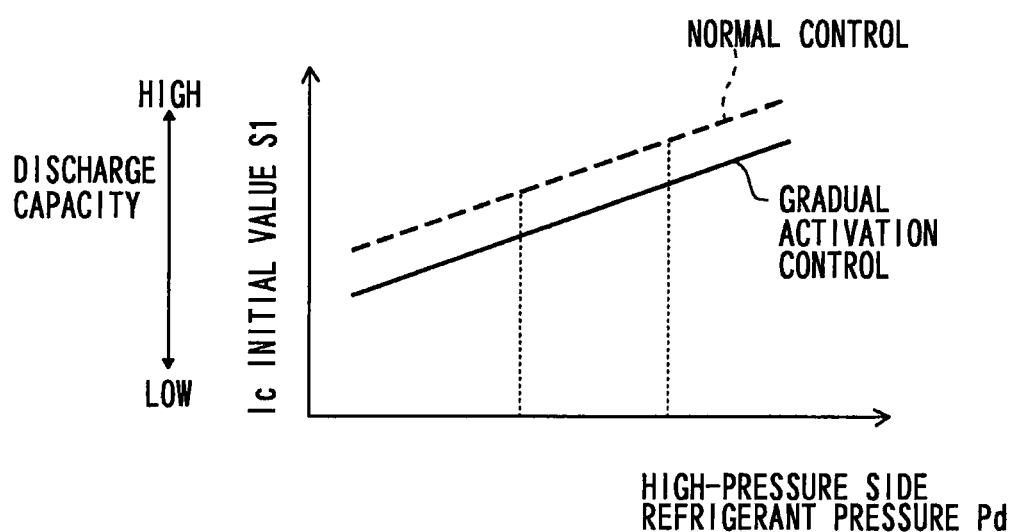
FIG. 9 is a control characteristic diagram showing a relationship between a high-pressure side refrigerant pressure Pd and an Ic initial value S1 (an initial value S1 of a control current value Ic) of a discharge capacity of a compressor for a refrigerant cycle device at an activation time of the compressor, according to a modification of embodiments.

For example, as shown in FIG. 9, the difference between the initial value of the discharge capacity in the normal control and the initial value of the discharge capacity in the gradual activation control may be determined to be a predetermined value. Alternatively, the difference between the initial value of the discharge capacity in the normal control and the initial value of the discharge capacity in the gradual activation control may be a predetermined percentage of the initial value of the discharge capacity determined in the normal control. In FIG. 3, the initial value of the discharge capacity is determined to be increased in accordance with increase of the high-pressure side refrigerant pressure Pd. Alternatively, the initial value of the discharge capacity may be determined to be increased in accordance with increase of the outside temperature Tam or with increase of the evaporator temperature Te.

(2) In the above-described embodiments, as shown in FIG. 4, if the gradual activation control is started, the initial value of the discharge capacity of the compressor 11 determined in the gradual activation control is kept until the gradual activation control is terminated at time T1. However, a control of the discharge capacity of the compressor 11 in the gradual activation control is not limited to this.

Figure 10A:
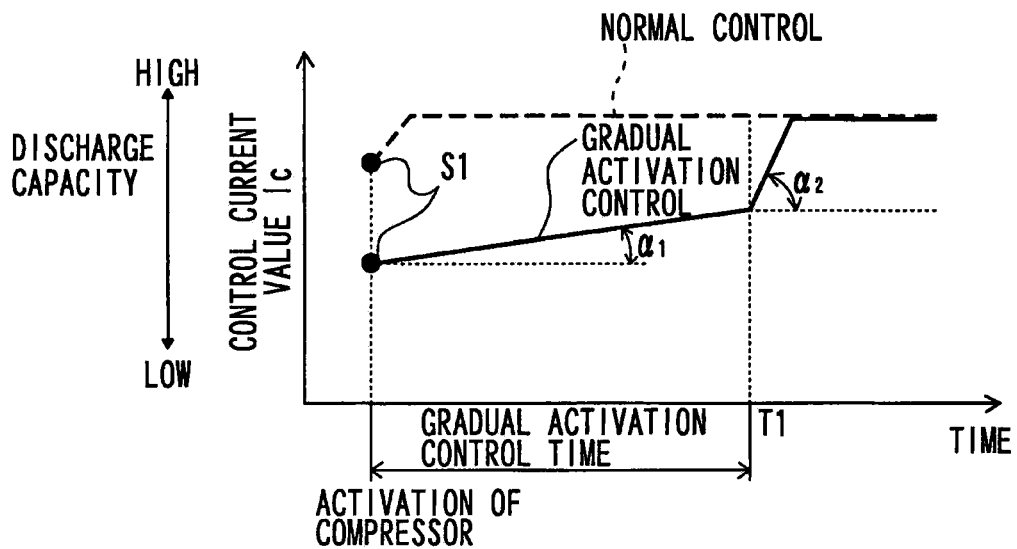
FIG. 10A is a time chart showing the discharge capacity (control current value Ic) of the compressor for the refrigerant cycle device according to a modification of embodiments.
Figure 10B:
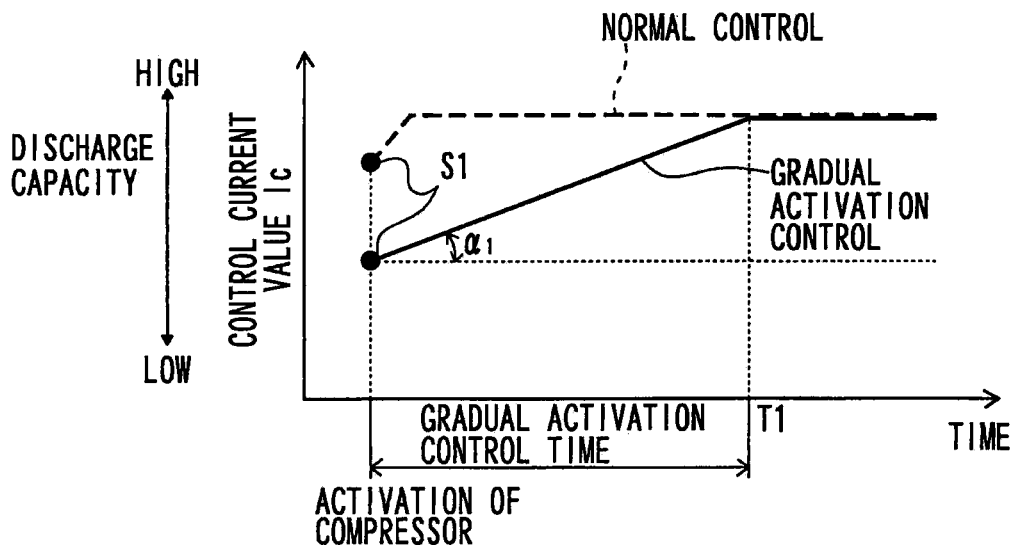
FIG. 10B is a time chart showing the discharge capacity (control current value Ic) of the compressor for the refrigerant cycle device according to a modification of embodiments.

For example, as shown in FIGS. 10A and 10B, the discharge capacity of the compressor 11 in the gradual activation control may be increased within a range lower than the discharge capacity determined in the normal control. Increasing rates of the discharge capacities shown by angles $\alpha_1$ of FIGS. 10A and 10B may be set to be lower than increasing rates of the discharge capacities shown by angles $\alpha_2$ of FIGS. 4 and 10A after the termination of the graduation activation control described in the first embodiment. By increasing of the angle $\alpha_1$, in the gradual activation control, the discharge capacity can be made to approach the discharge capacity determined in the normal control promptly.

(3) In the above-described embodiments, the gradual activation control is continued from the activation time of the compressor until the air-conditioning thermal load of the vehicle compartment is determined not to be in the high load state, or until the noise audible to a passenger other than the refrigerant passing noise is determined not to be in the low noise state. Alternatively, the gradual activation control may be continued from the activation time of the compressor 11 until a predetermined period T elapses.

In this case, in the extension gradual activation mode described in the third embodiment, the gradual activation control is continued until a period (T+Tex) elapses, which is obtained by adding the extension time Tex to the predetermined period T. Additionally, in the above-described embodiments, the extension time Tex is set to be 10 seconds, for example. Based on a study of the inventor, the extension time Tex may be equal to or more than 10 seconds, and may be equal to or less than 60 seconds.

(4) In the above-described embodiments, the refrigerant cycle devices 10, 40 are used for the vehicle air conditioners 1, 2, but the refrigerant cycle devices 10, 40 does not limited to be used for the vehicle air conditioners 1, 2. For example, the refrigerant cycle devices 10, 40 may be used for a refrigeration vehicle. In this case, the air-conditioning target space may be an inside of a freezer of the refrigeration vehicle.

(5) In the above-described embodiments, a swash plate-type variable displacement compressor is adopted as the compressor 11, but the compressor 11 is not limited to this. For example, an electrical compressor, in which a fixed displacement compression mechanism is driven by an electrical motor, may be adopted as the compressor 11.

In this case, the electrical motor may be used as an example of the discharge capacity changing portion, and the air conditioning controller 30 may control a rotation rate Nc of the electrical motor to control the discharge capacity of the compressor 11. An activation time of the compressor 11 that is the electrical compressor may be defined as when a rotation signal is outputted from the air conditioning controller 30 to the electrical motor. Therefore, the control current value Ic may be changed to the rotation rate Nc in the time charts of FIGS. 4, 8, and the air conditioning controller 30 may control the rotation rate Nc similarly to the case in which a swash plate-type variable displacement compressor is adopted as the compressor 11.

Moreover, in this case, even if a driving torque of the electrical compressor is changed, the rotation rate Ne of the engine is not affected. Thus, the discharge capacity (rotation rate Nc) of the compressor 11 may be increased promptly to be equivalent to the discharge capacity determined in the normal control when the gradual activation control is switched to the normal control after a termination of the gradual activation control at time T1. In other words, the angle $\alpha_2$ in FIG. 4 may be approximately 90°. Accordingly, when the gradual activation mode is switched to the normal mode, the air cooling capacities of the refrigerant cycle devices 10, 40 can be increased promptly in the electrical compressor.

(6) In the above-described embodiments, the control portion of the air conditioning controller 30 used as an example of the load determination portion which determines whether the air-conditioning thermal load is in the high load state based on the outside temperature Tam and on the evaporator temperature Te at step S10. However, the determination of the high load state is not limited to this.

For example, the high load state may be determined based on any one of the outside temperature Tam and the evaporator temperature Te. Alternatively, the air-conditioning thermal load may be determined to be in the high load state when the high-pressure side refrigerant pressure Pd detected by the pressure sensor 33 is equal to or higher than a predetermined pressure KPd.

In the above-described embodiments, the control portion of the air conditioning controller 30 used as an example of the noise determination portion which determines whether the audible noise other than the refrigerant passing noise is in the low noise state or not based on the blower voltage of the blower 22 and on the vehicle speed Vs, at step S20. However, the determination of the low noise state is not limited to this.

For example, the low noise state may be determined based on any one of the blower voltage of the blower 22 and the vehicle speed Vs. Alternatively, the audible noise may be determined to be in the low noise state when the rotation rate Ne of the engine is equal to or lower than a predetermined rotation rate KNe.

(7) In the above-described refrigerant cycle devices 10, 40, the evaporators 14, 44 are used as examples of the interior heat exchanger, and the radiator 12 is used as an example of the exterior heat exchanger which radiates heat to the atmosphere. Alternatively, the evaporators 14, 44 may be used as examples of an exterior heat exchanger which absorbs heat from a heat source such as the atmosphere, and the radiator 12 may be used as an interior heat exchanger which heat air blown toward the air-conditioning target space.

For example, the refrigerant cycle device 1 of the above embodiments may be described or modified as follows.

The refrigerant cycle device 1 for a vehicle is adapted to adjust a temperature of air blown into the air-conditioning target space by utilizing heat of refrigerant circulating in the refrigerant cycle of the refrigerant cycle device. The refrigerant cycle 1 device includes the compressor 11, the discharge capacity control portion 30a and the load determination portion (S10). The compressor 11 is configured to compress refrigerant and to discharge the compressed refrigerant. The discharge capacity control portion 30a is configured to control the discharge capacity of the compressor 11. The load determination portion (S10) is configured to determine whether the air-conditioning thermal load of the air-conditioning target space is in the high load state in which the air-conditioning thermal load is equal to or higher than a predetermined air-conditioning thermal load. The discharge capacity control portion 30a performs the normal control in which the discharge capacity of the compressor 11 is increased in accordance with increase of the air-conditioning thermal load of the air-conditioning target space. The discharge capacity control portion 30a performs the gradual activation control, in which the discharge capacity of the compressor 11 is set to be lower than the discharge capacity determined in the normal control, when the load determination portion (S10) determines that the air-conditioning thermal load is in the high load state at an activation time of the compressor 11.

Thus, when the air-conditioning thermal load is in the high load state at the activation time of the compressor 11, the discharge capacity of the compressor 11 can be reduced relative to that in the normal control. Hence, a refrigerant circulation rate in the refrigerant cycle device 1 can be reduced even in the high load state where the refrigerant rate is likely to be large. Therefore, the refrigerant passing noise harsh for a passenger can be limited at the activation time of the compressor 11.

The effect of limiting the refrigerant passing noise can be obtained also when refrigerant having a higher density than predetermined refrigerant is adopted as refrigerant of an existing refrigerant cycle device which is generally used for the predetermined refrigerant. Therefore, versatility of the existing refrigerant cycle device can be improved.

The "air-conditioning thermal load" can represented as a necessary heat amount generated by the refrigerant cycle device 1 for heating or cooling the air-conditioning target space and for keeping the air-conditioning target space at a desired temperature.

The refrigerant cycle device 1 further includes the noise determination portion (S20). The noise determination portion (S20) is configured to determine whether the noise audible to a passenger, other than the refrigerant passing noise generated when refrigerant passes through the refrigerant cycle, is in the low noise state in which a level of the audible noise other than the refrigerant passing noise is equal to or lower than a predetermined noise level. The discharge capacity control portion 30a performs the gradual activation control in which the discharge capacity of the compressor 11 is set to be lower than the discharge capacity determined in the normal control, when the noise determination portion (S20) determines that the audible noise other than the refrigerant passing noise is in the low noise state at the activation time of the compressor 11.

Thus, (i) when the air-conditioning thermal load is in the high load state at the activation time of the compressor 11, and (ii) when the audible noise other than the refrigerant passing noise is in the low noise state, the discharge capacity of the compressor 11 can be reduced relative to that in the normal control. Hence, a refrigerant circulation rate in the refrigerant cycle device 1 can be reduced especially when the audible noise harsh for a passenger is likely to be heard by the passenger. Therefore, the temperature adjusting performance of the refrigerant cycle device 1 can be avoided from being reduced unnecessarily.

Figure 2:
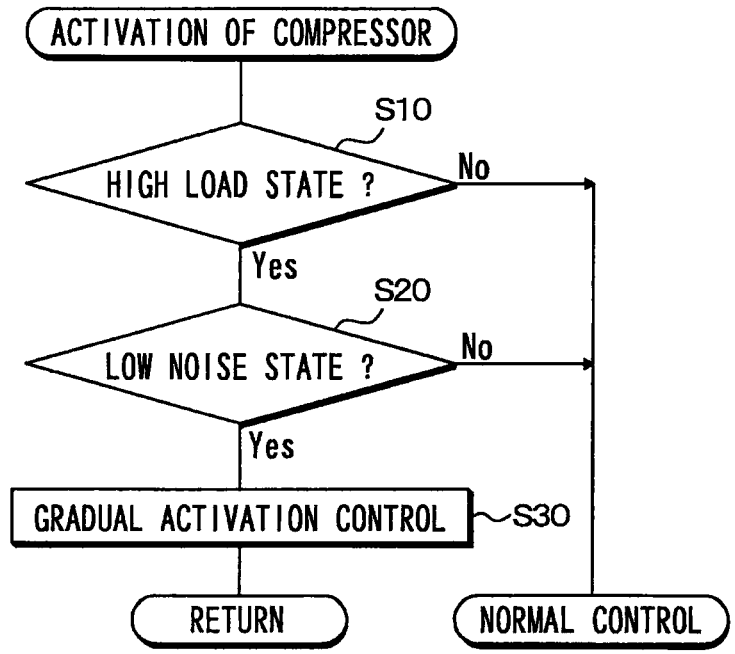
FIG. 2 is a flowchart showing a part of a control flow of the refrigerant cycle device according to the first embodiment.

The refrigerant cycle device 1 may not include SW in FIG. 2. In this case, the discharge capacity control portion 30a performs the gradual activation control regardless of the air-conditioning thermal load, when the noise determination portion (S20) determines that the audible noise other than the refrigerant passing noise is in the low noise state at the activation time of the compressor 11.

Thus, when the audible noise other than the refrigerant passing noise is in the low noise state at the activation time of the compressor 11, the discharge capacity of the compressor 11 can be reduced relative to that in the normal control. Hence, a refrigerant circulation rate in the refrigerant cycle device 1 can be reduced even in the low noise state where the refrigerant passing noise is likely to be harsh for a passenger. Moreover, also in this case, the versatility of the existing refrigerant cycle device can be improved.

The air-conditioning target space may be the vehicle compartment of the vehicle, and the refrigerant cycle device 1 may further include the plurality of air outlets, and the air outlet changing portion (29a, 29b, 29c). Through the plurality of air outlets, air is blown into the vehicle compartment, and the plurality of air outlets includes a defroster air outlet through which air is blown toward a windshield in the vehicle compartment. The air outlet mode changing portion (29a, 29b, 29c) is configured to change open/close states of the plurality of air outlets. The discharge capacity control portion 30a may perform the gradual activation control when a flow of air from the defroster air outlet into the vehicle compartment is interrupted by the air outlet mode changing portion (29a, 29b, 29c) at the activation time of the compressor 11.

The time when the air is blown into the vehicle compartment from the defroster air outlet to the windshield is a time when the windshield is required to be prevented from fogging. Thus, the temperature adjusting performance of the refrigerant cycle device 1 may be better not to be reduced in order to ensure visibility (safety) from the windshield. In the present disclosure, as described above, the discharge capacity control portion 30a may perform the gradual activation control when the flow of air from the defroster air outlet into the vehicle compartment is interrupted by the air outlet mode changing portion (29a, 29b, 29c). Therefore, the visibility (safety) from the windshield can be ensured.

When the flow of air from the defroster air outlet into the vehicle compartment is interrupted by the air outlet mode changing portion (29a, 29b, 29c), the flow of air from the defroster air outlet into the vehicle compartment may be completely interrupted, or a small amount of air may be blown from the defroster air outlet into the vehicle compartment.

The refrigerant cycle device may further include the defroster requirement input portion through which a passenger sets the defroster mode in which conditioned air is blown into the vehicle compartment from the defroster air outlet. The air outlet changing portion (29a, 29b, 29c) may open the defroster air outlet such that conditioned air is blown into the vehicle compartment from the defroster air outlet when the defroster mode is set by the passenger.

The time when a passenger sets the defroster mode by using the defroster requirement input portion is a time when a high performance for antifogging of the windshield is required. Thus, when the high antifogging performance is required, the gradual activation control can be avoided from being performed. Therefore, the visibility (safety) from the windshield can be improved.

The discharge capacity changing portion 30a may determine a difference between the initial value of the discharge capacity in the gradual activation control and the initial value of the discharge capacity in the normal control, based on the air-conditioning thermal load relevant to the refrigerant circulation rate in the refrigerant cycle device 1. Therefore, it can be limited that the temperature adjusting performance of the refrigerant cycle device 1 is reduced unnecessarily in order to limit generation of the refrigerant passing noise harsh for a passenger.

The discharge capacity changing portion 30a may increase the difference in accordance with the increase of the air-conditioning thermal load. The discharge capacity changing portion 30a may keep the discharge capacity of the compressor 11 at the initial value of the discharge capacity during the gradual activation control.

The discharge capacity changing portion 30a may gradually increase the discharge capacity of the compressor 11 after the gradual activation control is terminated and is switched to the normal control.

The refrigerant cycle device 1 may further include the front-seat evaporator 14, the rear-seat evaporator 44, the front-seat refrigerant pipe 41a, the rear-seat refrigerant pipe 41b and the open-close portion (42). In the front-seat evaporator 14, low pressure refrigerant evaporates by exchanging heat with air to be blown toward the front-seat side of the vehicle compartment. In the rear-seat evaporator 44, low pressure refrigerant evaporates by exchanging heat with air to be blown toward the rear-seat side of the vehicle compartment. The front-seat refrigerant pipe 41a connects the compressor 11 and the front-seat evaporator 14. The rear-seat refrigerant pipe 41b connects the compressor 11 and the rear-seat evaporator. The rear-seat refrigerant pipe 41b is longer than the front-seat refrigerant pipe 41a. The open-close portion (42) is configured to open or close the rear-seat refrigerant pipe 41b. The discharge capacity changing portion 30a may adjust a period of performing the gradual activation control to be longer when the rear-seat refrigerant pipe 41b is open, than that when the rear-seat refrigerant pipe 41b is closed.

(i) When the front-seat refrigerant pipe 41a is shorter than the rear-seat refrigerant pipe 41b, and (ii) when the compressor 11 is activated in a state where the open-close portion (42) opens the rear-seat refrigerant pipe 41b, the increasing rate of the refrigerant circulation rate in the front-seat evaporator 14 is higher than that in the rear-seat evaporator 44. Therefore, the refrigerant passing noise may increase in the rear-seat evaporator 44 after increase of the refrigerant passing noise in the front-seat evaporator 14.

In the present disclosure, the period of performing the gradual activation time may be lengthened more when the open-close portion (42) is open to guide refrigerant into the rear-seat refrigerant pipe 41b, than when the open-close portion (42) is closed. Thus, the refrigerant cycle device 1 can limit that not only the refrigerant passing noise in the front-seat evaporator 14 but also the refrigerant passing noise generated subsequently in the rear-seat evaporator 44 become harsh for a passenger.

Additional advantages and modifications will readily occur to those skilled in the art. The disclosure in its broader terms is therefore not limited to the specific details, representative apparatus, and illustrative examples shown and described.

What is claimed is:

1. A refrigerant cycle device for a vehicle, adapted to adjust a temperature of air blown into an air-conditioning target space by utilizing heat of refrigerant circulating through a refrigerant cycle of the refrigerant cycle device, the refrigerant cycle device comprising:
   a compressor configured to compress the refrigerant and to discharge the compressed refrigerant;
   a discharge capacity control portion configured to control a discharge capacity of the compressor;
   a noise determination portion configured to determine whether a noise audible to a passenger, other than a refrigerant passing noise generated from the refrigerant when the refrigerant circulates through the refrigerant cycle, is in a low noise state in which a level of the audible noise other than the refrigerant passing noise is equal to or lower than a predetermined noise level;
   a decompressor decompressing the compressed refrigerant discharged by the compressor; and
   a pressure sensor being disposed between the compressor and the decompressor and detecting a pressure of the compressed refrigerant, wherein
   the discharge capacity control portion performs a normal control in which the discharge capacity of the compressor is increased in accordance with an increase of an air-conditioning thermal load of the air-conditioning target space,
   the discharge capacity control portion performs a gradual activation control in which the discharge capacity of the compressor is set to be lower than the discharge capacity determined in the normal control, when the noise determination portion determines that the audible noise other than the refrigerant passing noise is in the low noise state at an activation time of the compressor, and
   the discharge capacity control portion sets an initial value of the discharge capacity in the gradual activation control at the activation time of the compressor to be lower than an initial value of the discharge capacity in the normal control at the activation time of the compressor, based on the pressure detected by the pressure sensor at the activation time of the compressor.

2. The refrigerant cycle device according to claim 1, wherein the air-conditioning target space is a vehicle compartment of the vehicle,
   the refrigerant cycle device further comprising:
   a plurality of air outlets through which air is blown into the vehicle compartment, the plurality of air outlets including a defroster air outlet through which air is blown toward a windshield in the vehicle compartment; and
   an air outlet mode changing portion configured to change open/close states of the plurality of air outlets, wherein
   the discharge capacity control portion performs the gradual activation control when a flow of air from the defroster air outlet into the vehicle compartment is interrupted by the air outlet mode changing portion at the activation time of the compressor.

3. The refrigerant cycle device according to claim 2, further comprising
a defroster requirement input portion through which a passenger sets a defroster mode in which conditioned air is blown into the vehicle compartment from the defroster air outlet, wherein
the air outlet changing portion opens the defroster air outlet such that conditioned air is blown into the vehicle compartment from the defroster air outlet when the defroster mode is set by the passenger.

4. The refrigerant cycle device according to claim 1, wherein
the discharge capacity control portion increases a difference between the initial value of the discharge capacity in the gradual activation control and the initial value of the discharge capacity in the normal control, in accordance with the increase of the air-conditioning thermal load.

5. The refrigerant cycle device according to claim 1, wherein
the discharge capacity control portion keeps the discharge capacity of the compressor at the initial value of the discharge capacity during the gradual activation control.

6. The refrigerant cycle device according to claim 1, wherein
the discharge capacity control portion gradually increases the discharge capacity of the compressor after the gradual activation control is terminated and is switched to the normal control.

7. The refrigerant cycle device according to claim 1, wherein the air-conditioning target space is a vehicle compartment of the vehicle,
the refrigerant cycle device further comprising:
a front-seat evaporator in which low pressure refrigerant evaporates by exchanging heat with air to be blown toward a front-seat side of the vehicle compartment;
a rear-seat evaporator in which low pressure refrigerant evaporates by exchanging heat with air to be blown toward a rear-seat side of the vehicle compartment;
a front-seat refrigerant pipe which connects the compressor and the front-seat evaporator;
a rear-seat refrigerant pipe which connects the compressor and the rear-seat evaporator, the rear-seat refrigerant pipe being longer than the front-seat refrigerant pipe; and
an open-close portion configured to open or close the rear-seat refrigerant pipe, wherein
the discharge capacity control portion adjusts a period of performing the gradual activation control to be longer when the rear-seat refrigerant pipe is open, than that when the rear-seat refrigerant pipe is closed.

8. The refrigerant cycle device according to claim 1, wherein the activation time of the compressor is immediately after an initial activation of the compressor.

9. The refrigerant cycle device according to claim 1, further comprising:
an evaporator in which the refrigerant from the compressor absorbs heat to evaporate via heat exchange heat with the air that is to be blown into the air-conditioning target space;
an outside temperature sensor that detects a temperature of outside air; and
an evaporator temperature sensor which detects a temperature of the air flowing out of the evaporator, wherein
a load determination portion configured to determine, based on detection values of the outside temperature sensor, the pressure sensor and the evaporator temperature sensor, whether an air-conditioning thermal load of the air-conditioning target space is in a high load state in which the air-conditioning thermal load is equal to or higher than a predetermined air-conditioning thermal load.

10. The refrigerant cycle device according to claim 9, wherein the activation time of the compressor is immediately after an initial activation of the compressor.

11. The refrigerant cycle device according to claim 1, wherein the discharge capacity control portion increases a difference between the initial values at the activation time of the compressor in accordance with increase of the pressure of the compressed refrigerant at the activation time of the compressor.

12. The refrigerant cycle device according to claim 1, wherein the discharge capacity control portion performs the gradual activation control in which the discharge capacity of the compressor is set to be lower than the discharge capacity determined in the normal control, when the noise determination portion determines that the audible noise other than the refrigerant passing noise is in the low noise state at the activation time of the compressor and antifogging is not required.

13. The refrigeration cycle device according to claim 1, further comprising:
an open-close portion configured to open or close a rear-seat refrigerant pipe, wherein
the discharge capacity control portion adjusts a period of performing the gradual activation control to be longer when the rear-seat refrigerant pipe is open, than that when the rear-seat refrigerant pipe is closed.

14. The refrigerant cycle device according to claim 1, wherein
the discharge capacity control portion controls the discharge capacity of the compressor by controlling a current value outputted to the compressor.

15. A refrigerant cycle device for a vehicle, adapted to adjust a temperature of air blown into an air-conditioning target space by utilizing heat of refrigerant circulating in a refrigerant cycle of the refrigerant cycle device, the refrigerant cycle device comprising:
a compressor configured to compress refrigerant and to discharge the compressed refrigerant;
a discharge capacity control portion configured to control a discharge capacity of the compressor;
a load determination portion configured to determine whether an air-conditioning thermal load of the air-conditioning target space is in a high load state in which the air-conditioning thermal load is equal to or higher than a predetermined air-conditioning thermal load;
a decompressor decompressing the compressed refrigerant discharged by the compressor; and
a pressure sensor being disposed between the compressor and the decompressor and detecting a pressure of the compressed refrigerant, wherein
the discharge capacity control portion performs a normal control, in which the discharge capacity of the compressor is increased in accordance with an increase of the air-conditioning thermal load,
the discharge capacity control portion performs a gradual activation control, in which the discharge capacity of the compressor is set to be lower than the discharge capacity determined in the normal control, when the load determination portion determines that the air-conditioning thermal load is in the high load state at an activation time of the compressor, and the discharge capacity control portion sets an initial value of the discharge capacity in the gradual activation control at the activation time of the compressor to be lower than an initial value of the discharge capacity in the normal control at the activation time of the compressor, based on the pressure detected by the pressure sensor at the activation time of the compressor.

16. The refrigerant cycle device according to claim 15, further comprising:
a noise determination portion configured to determine whether a noise audible to a passenger, other than a refrigerant passing noise generated when refrigerant passes through the refrigerant cycle, is in a low noise state in which a level of the audible noise other than the refrigerant passing noise is equal to or lower than a predetermined noise level, wherein
the discharge capacity control portion performs the gradual activation control when the noise determination portion determines that the audible noise other than the refrigerant passing noise is in the low noise state at the activation time of the compressor.

17. The refrigerant cycle device according to claim 15, wherein the air-conditioning target space is a vehicle compartment of the vehicle,
the refrigerant cycle device further comprising:
a plurality of air outlets through which air is blown into the vehicle compartment, the plurality of air outlets including a defroster air outlet through which air is blown toward a windshield in the vehicle compartment; and
an air outlet mode changing portion configured to change open/close states of the plurality of air outlets, wherein
the discharge capacity control portion performs the gradual activation control when a flow of air from the defroster air outlet into the vehicle compartment is interrupted by the air outlet mode changing portion at the activation time of the compressor.

18. The refrigerant cycle device according to claim 17, further comprising
a defroster requirement input portion through which a passenger sets a defroster mode in which conditioned air is blown into the vehicle compartment from the defroster air outlet, wherein
the air outlet changing portion opens the defroster air outlet such that conditioned air is blown into the vehicle compartment from the defroster air outlet when the defroster mode is set by the passenger.

19. The refrigerant cycle device according to claim 15, wherein
the discharge capacity control portion increases a difference between the initial value of the discharge capacity in the gradual activation control and the initial value of the discharge capacity in the normal control, in accordance with the increase of the air-conditioning thermal load.

20. The refrigerant cycle device according to claim 15, wherein
the discharge capacity control portion keeps the discharge capacity of the compressor at the initial value of the discharge capacity during the gradual activation control.

21. The refrigerant cycle device according to claim 15, wherein
the discharge capacity control portion gradually increases the discharge capacity of the compressor after the gradual activation control is terminated and is switched to the normal control.

22. The refrigerant cycle device according to claim 15, wherein the air-conditioning target space is a vehicle compartment of the vehicle,
the refrigerant cycle device further comprising:
a front-seat evaporator in which low pressure refrigerant evaporates by exchanging heat with air to be blown toward a front-seat side of a vehicle compartment;
a rear-seat evaporator in which low pressure refrigerant evaporates by exchanging heat with air to be blown toward a rear-seat side of the vehicle compartment;
a front-seat refrigerant pipe which connects the compressor and the front-seat evaporator;
a rear-seat refrigerant pipe which connects the compressor and the rear-seat evaporator, the rear-seat refrigerant pipe being longer than the front-seat refrigerant pipe; and
an open-close portion configured to open or close the rear-seat refrigerant pipe, wherein
the discharge capacity control portion adjusts a period of performing the gradual activation control to be longer when the rear-seat refrigerant pipe is open, than that when the rear-seat refrigerant pipe is closed.

23. The refrigerant cycle device according to claim 15, wherein the activation time of the compressor is immediately after an initial activation of the compressor.

24. The refrigerant cycle device according to claim 15, further comprising:
an evaporator in which the refrigerant from the compressor absorbs heat to evaporate via heat exchange heat with the air that is to be blown into the vehicle compartment;
an outside temperature sensor that detects a temperature of outside air; and
an evaporator temperature sensor which detects a temperature of the air flowing out of the evaporator, wherein
the load determination portion configured to determine whether the air-conditioning thermal load of the air-conditioning target space is in the high load state is based on detection values of the outside temperature sensor, the pressure sensor and the evaporator temperature sensor.

25. The refrigerant cycle device according to claim 24, wherein the activation time of the compressor is immediately after an initial activation of the compressor.

26. The refrigerant cycle device according to claim 15, wherein the discharge capacity control portion increases a difference between the initial values at the activation time of the compressor in accordance with increase of the pressure of the compressed refrigerant at the activation time of the compressor.

27. The refrigerant cycle device according to claim 15, wherein the discharge capacity control portion performs the gradual activation control in which the discharge capacity of the compressor is set to be lower than the discharge capacity determined in the normal control, when the noise determination portion determines that the audible noise other than the refrigerant passing noise is in the low noise state at the activation time of the compressor and antifogging is not required.

28. The refrigeration cycle device according to claim 15, further comprising:
   an open-close portion configured to open or close a rear-seat refrigerant pipe, wherein
   the discharge capacity control portion adjusts a period of performing the gradual activation control to be longer when the rear-seat refrigerant pipe is open, than that when the rear-seat refrigerant pipe is closed.

* * * * *